United States Patent
Chauvel et al.

(10) Patent No.: US 6,681,297 B2
(45) Date of Patent: Jan. 20, 2004

(54) SOFTWARE CONTROLLED CACHE CONFIGURATION BASED ON AVERAGE MISS RATE

(75) Inventors: Gerard Chauvel, Antibes (FR); Dominique D'Inverno, Villeneuve-Loubet (FR); Serge Lasserre, Frejus (FR)

(73) Assignee: Texas Instruments Incorporated, Dallas, TX (US)

( * ) Notice: Subject to any disclaimer, the term of this patent is extended or adjusted under 35 U.S.C. 154(b) by 279 days.

(21) Appl. No.: 09/932,222

(22) Filed: Aug. 17, 2001

(65) Prior Publication Data

US 2002/0065992 A1 May 30, 2002

(30) Foreign Application Priority Data

Aug. 21, 2000 (EP) .............................. 00402331
Dec. 15, 2000 (EP) .............................. 00403538
Jun. 13, 2001 (EP) ............................. 01401532

(51) Int. Cl.$^7$ .......................... G06F 12/08; G06F 11/34
(52) U.S. Cl. .......................... 711/130; 711/3; 711/134; 711/135; 711/138; 711/139; 711/133
(58) Field of Search .............................. 711/3, 133, 134, 711/135, 138, 139

(56) References Cited

U.S. PATENT DOCUMENTS 5,761,715 A 6/1998 Takahashi
5,978,888 A * 11/1999 Arimilli et al. ............. 711/128

OTHER PUBLICATIONS

IBM Technical Disclosure Bulletin, IBM Corp., NY, US; *Scheme for Producing Miss–Rate as a Function of Cache Size by Means of Traces Produced by Observing Misses From a Cache of Fixed Size*, vol. 33, No. 11, Apr. 1, 1991, pp. 36–39.

Texas Instruments Incorporated, S/N: 09/187,118, filed Nov. 5, 1998, *Computer Circuits, Systems, and Methods Using Partial Cache Cleaning*.

Texas Instruments Incorporated, S/N: 09/447,194, filed Nov. 22, 1999, *Optimized Hardware Cleaning Function for VIVT Data Cache*.

\* cited by examiner

*Primary Examiner*—Kevin Verbrugge
(74) *Attorney, Agent, or Firm*—Robert D. Marshall, Jr.; W. James Brady, III; Frederick J. Telecky, Jr.

(57) ABSTRACT

A digital system is provided with a several processors (1302), a shared level two (L2) cache (1300) having several segments per entry with associated tags, and a level three (L3) physical memory. Each tag entry includes a task-ID qualifier field and a resource ID qualifier field. Data is loaded into various lines in the cache in response to cache access requests when a given cache access request misses. After loading data into the cache in response to a miss, a tag associated with the data line is set to a valid state. In addition to setting a tag to a valid state, qualifier values are stored in qualifier fields in the tag. Each qualifier value specifies a usage characteristic of data stored in an associated data line of the cache, such as a task ID. A miss counter (532) counts each miss and a monitoring task (1311) determines a miss rate for memory requests. If a selected miss rate threshold value is exceeded, the digital system is reconfigured in order to reduce the miss rate. The cache is reconfigured in response to an operation command (1314), such that each tag in the array of tags that contains a specified qualifier value is modified in accordance with the operation command. Other types of reconfiguration can be performed, such as remapping a selected program portion to operate in a different address range, locking a portion of the data entries within the cache, or defining addresses corresponding to a selected program task as uncacheable, for example.

13 Claims, 11 Drawing Sheets

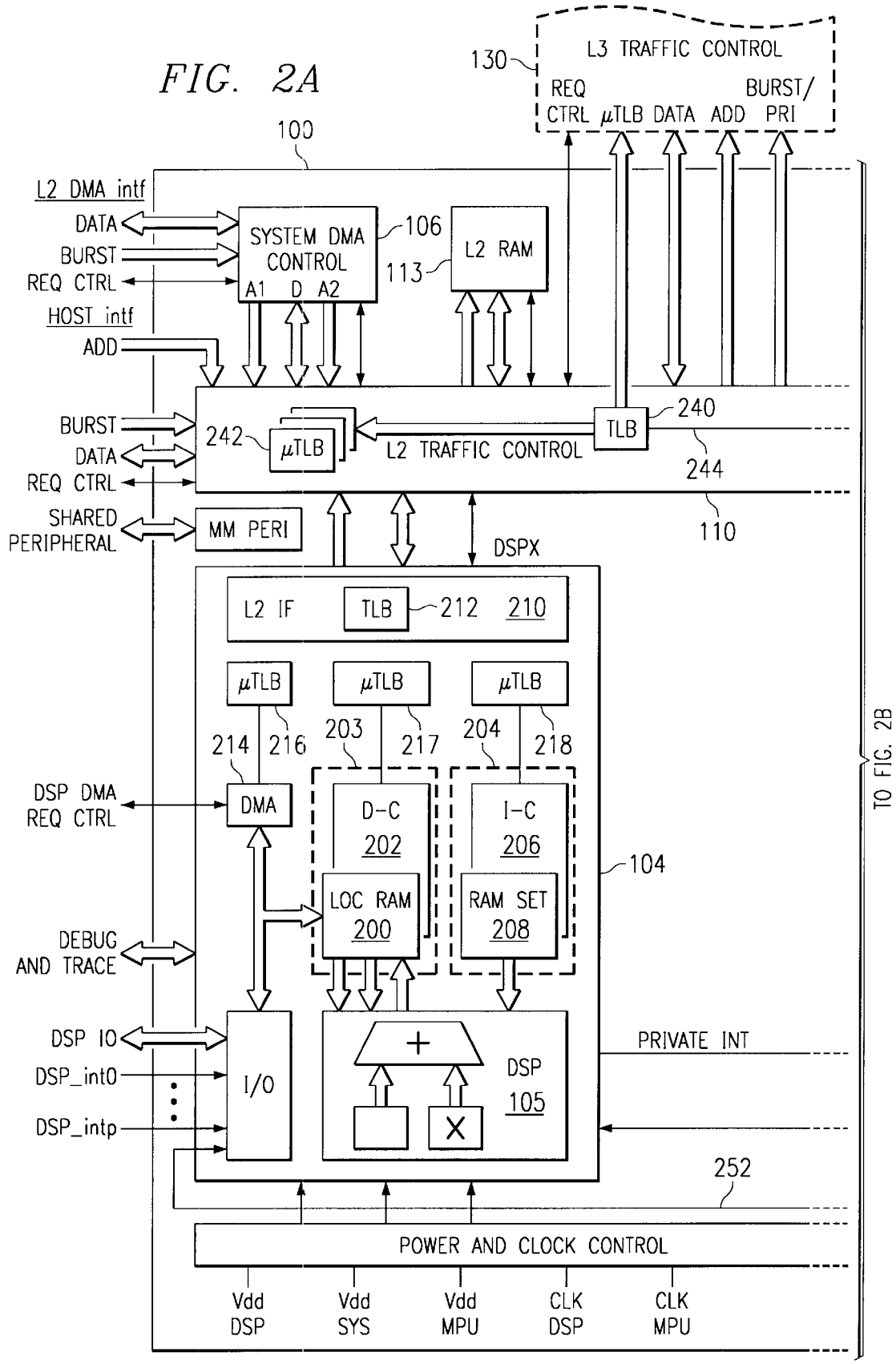

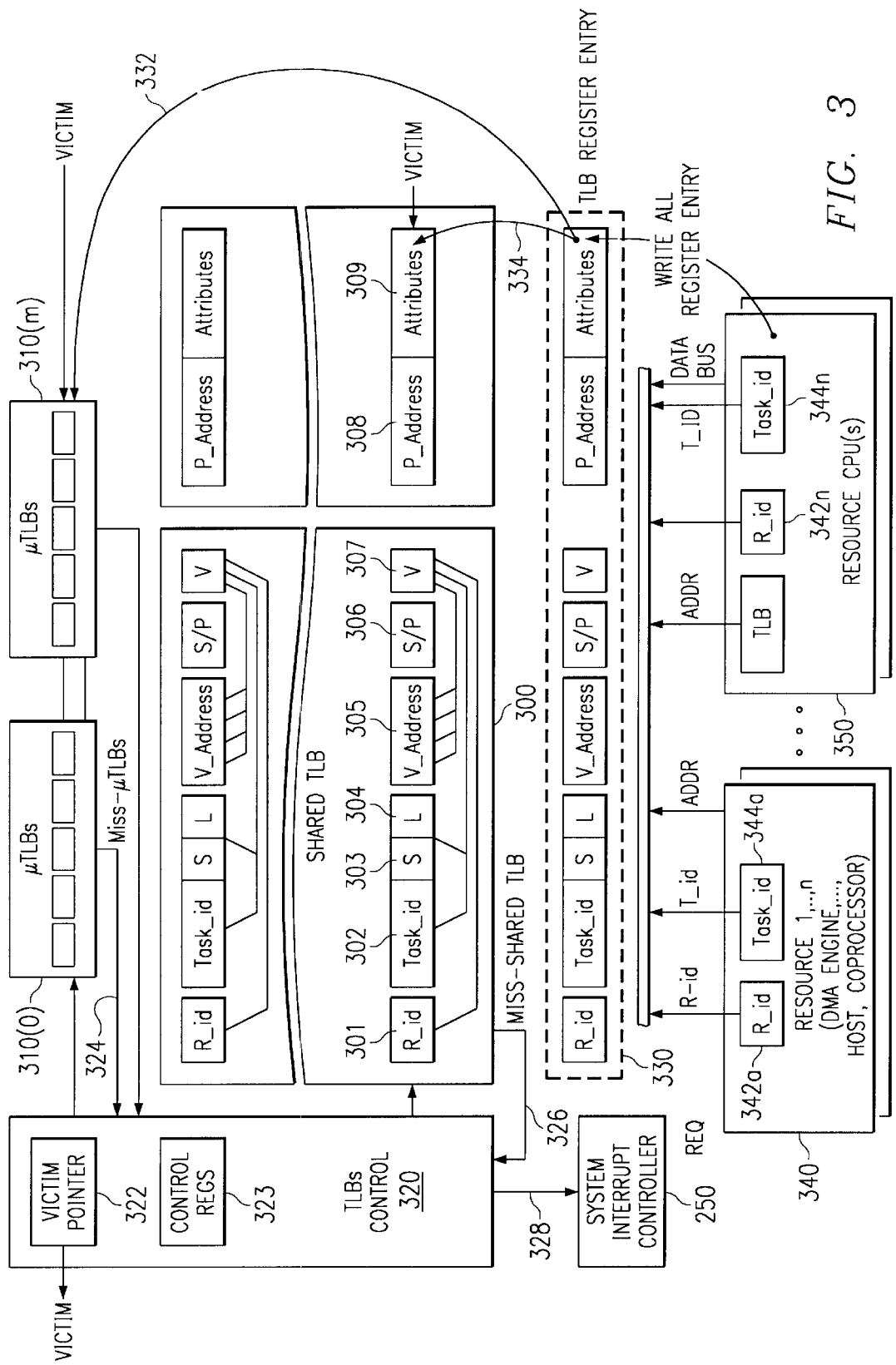

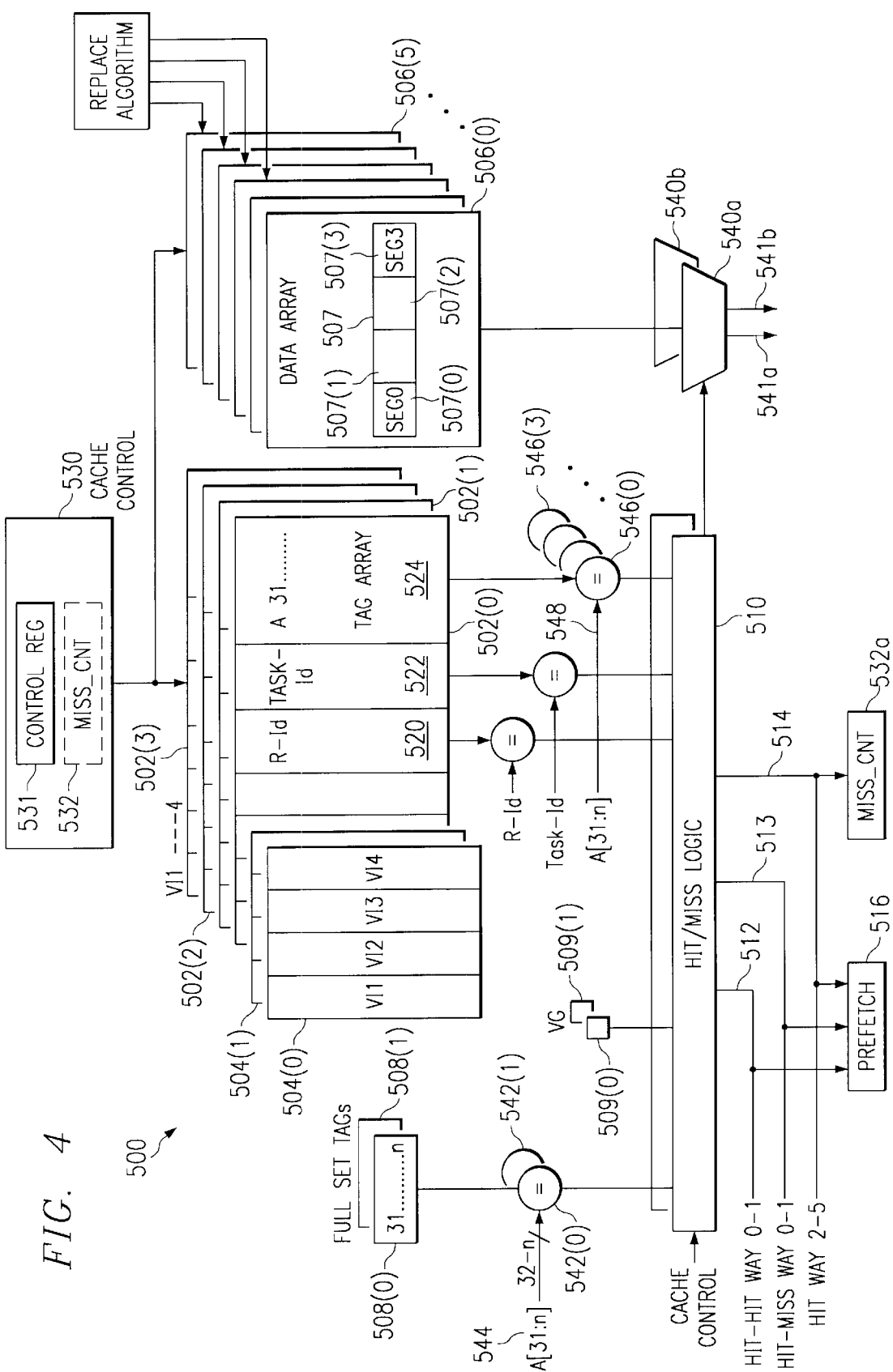

SOFTWARE CONTROLLED CACHE CONFIGURATION BASED ON AVERAGE MISS RATE

This application claims priority to European Application Serial No. 00402331.3, filed Aug. 21, 2000 European Application Serial No. 00403538.2, filed Dec. 15, 2000 and to European Application Serial No. 01401532.5, filed Jun. 13, 2001. U.S. patent application Ser. No. 09/932,651 is incorporated herein by reference.

1. Field of the Invention

This invention generally relates to microprocessors, and more specifically to improvements in cache memory access circuits, systems, and methods of making.

2. Background

Microprocessors are general purpose processors which provide high instruction throughputs in order to execute software running thereon, and can have a wide range of processing requirements depending on the particular software applications involved. A cache architecture is often used to increase the speed of retrieving information from a main memory. A cache memory is a high speed memory that is situated between the processing core of a processing device and the main memory. The main memory is generally much larger than the cache, but also significantly slower. Each time the processing core requests information from the main memory, the cache controller checks the cache memory to determine whether the address being accessed is currently in the cache memory. If so, the information is retrieved from the faster cache memory instead of the slower main memory to service the request. If the information is not in the cache, the main memory is accessed, and the cache memory is updated with the information.

Many different types of processors are known, of which microprocessors are but one example. For example, Digital Signal Processors (DSPs) are widely used, in particular for specific applications, such as mobile processing applications. DSPs are typically configured to optimize the performance of the applications concerned and to achieve this they employ more specialized execution units and instruction sets. Particularly in applications such as mobile telecommunications, but not exclusively, it is desirable to provide ever increasing DSP performance while keeping power consumption as low as possible.

To further improve performance of a digital system, two or more processors can be interconnected. For example, a DSP may be interconnected with a general purpose processor in a digital system. The DSP performs numeric intensive signal processing algorithms while the general purpose processor manages overall control flow. The two processors communicate and transfer data for signal processing via shared memory. A direct memory access (DMA) controller is often associated with a processor in order to take over the burden of transferring blocks of data from one memory or peripheral resource to another and to thereby improve the performance of the processor.

SUMMARY OF THE INVENTION

Particular and preferred aspects of the invention are set out in the accompanying independent and dependent claims. In accordance with a first embodiment of the invention, there is provided a method of operating a digital system that has a cache with an array of data lines with an associated array of tags. Data is loaded into various of lines in the cache in response to cache access requests when a given cache access request misses. After loading data into the cache in response to a miss, a tag associated with the data line is set to a valid state. In addition to setting a tag to a valid state, a qualifier value is stored in a qualifier field in the tag. The qualifier value specifies a usage characteristic of data stored in an associated data line of the cache. A miss rate is determined for memory requests in which a requested data value for a selected monitored-qualifier value is not valid within the cache. A threshold value for the miss rate is selected and an aspect of the digital system is reconfigured if the miss rate exceeds the threshold value. One manner of reconfiguration is flushing a set of entries which have a selected qualifier value.

Another manner of reconfiguration is remapping a selected program portion to operate in a different address range.

Another manner of reconfiguration is locking a portion of the data entries within the cache or within a RAM Set of a SmartCache.

Another manner of reconfiguration is defining ranges of addresses corresponding to a selected program task as uncacheable.

In another embodiment, a digital system is provided with a cache that has a data array with a set of lines for holding data and a tag array having a set of lines for holding a set of tags. Each line of the tag array is associated with a particular line of the data array and each line of the tag array contains an address field and a qualifier field. A miss counter counts each cache memory request miss corresponding to a monitored-qualifier value, such as a task-ID, and a monitoring task determines a miss rate for memory requests. If a selected miss rate threshold value is exceeded, the digital system is reconfigured in order to reduce the miss rate. The cache is reconfigured in response to an operation command, such that each tag in the set of tags that contains a specified qualifier value is modified in accordance with the operation command.

BRIEF DESCRIPTION OF THE DRAWINGS

Particular embodiments in accordance with the invention will now be described, by way of example only, and with reference to the accompanying drawings in which like reference signs are used to denote like parts and in which the Figures relate to the digital system of FIG. 1 and in which:

FIGS. 2A and 2B together is a more detailed block diagram of the megacell core of FIG. 1;

FIG. 3 is a block diagram illustrating a shared translation lookaside buffer (TLB) and several associated micro-TLBs ($\mu$TLB) included in the megacell of FIG. 2;

FIG. 4 is a block diagram illustrating a configurable cache that is included in the megacell of FIG. 1 that has a cache and a RAM-set;

Corresponding numerals and symbols in the different figures and tables refer to corresponding parts unless otherwise indicated.

DETAILED DESCRIPTION OF EMBODIMENTS OF THE INVENTION

Although the invention finds particular application to Digital Signal Processors (DSPs), implemented, for example, in an Application Specific Integrated Circuit (ASIC), it also finds application to other forms of processors. An ASIC may contain one or more megacells which each include custom designed functional circuits combined with pre-designed functional circuits provided by a design library.

Figure 1:
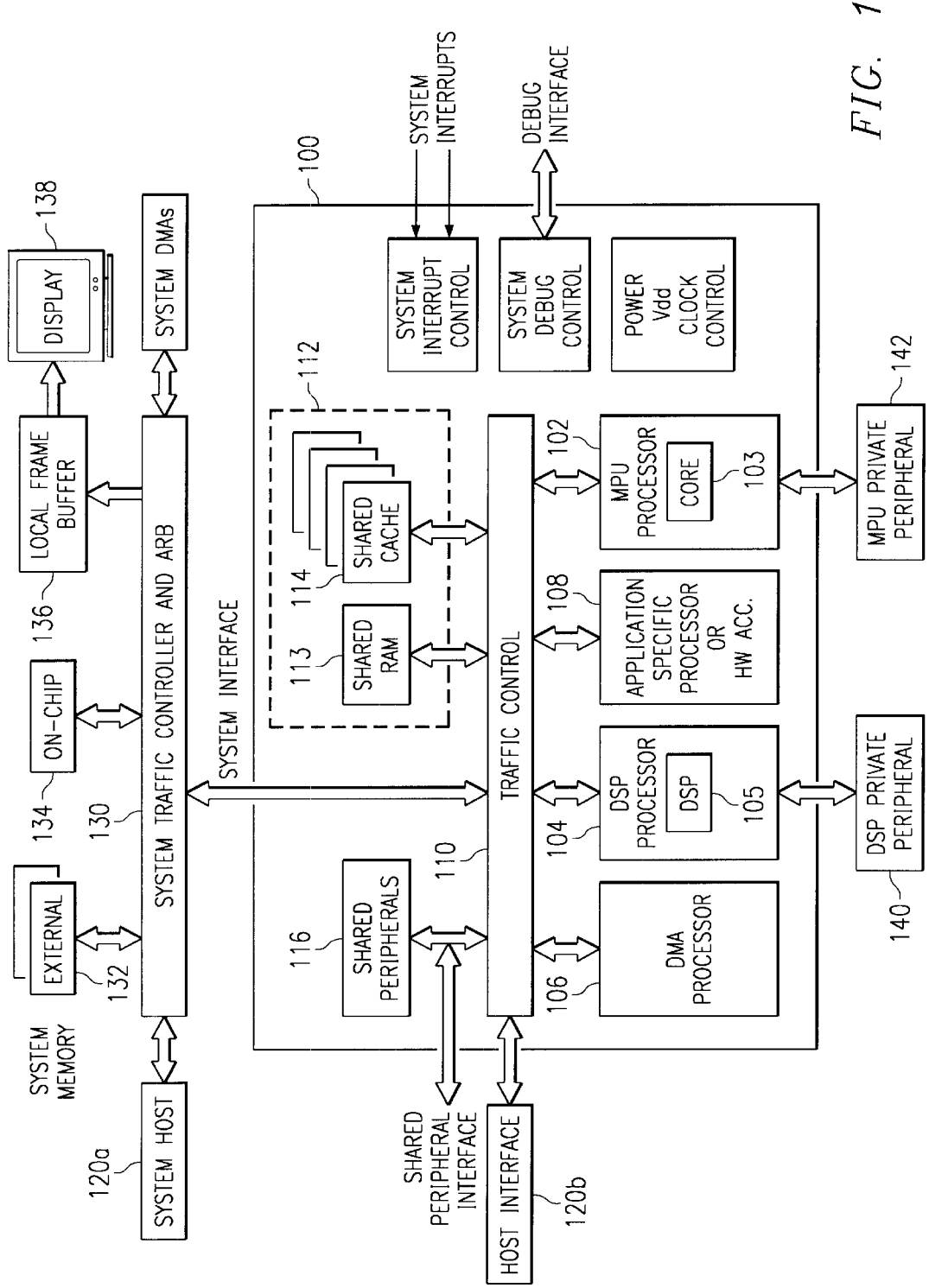
FIG. 1 is a block diagram of a digital system that includes an embodiment of the present invention in a megacell core having multiple processor cores.

FIG. 1 is a block diagram of a digital system that includes an embodiment of the present invention in a megacell core 100 having multiple processor cores. In the interest of clarity, FIG. 1 only shows those portions of megacell 100 that are relevant to an understanding of an embodiment of the present invention. Details of general construction for DSPs are well known, and may be found readily elsewhere. For example, U.S. Pat. No. 5,072,418 issued to Frederick Boutaud, et al, describes a DSP in detail. U.S. Pat. No. 5,329,471 issued to Gary Swoboda, et al, describes in detail how to test and emulate a DSP. Details of portions of megacell 100 relevant to an embodiment of the present invention are explained in sufficient detail herein below, so as to enable one of ordinary skill in the microprocessor art to make and use the invention.

Referring again to FIG. 1, megacell 100 includes a control processor (MPU) 102 with a 32-bit core 103 and a digital signal processor (DSP) 104 with a DSP core 105 that share a block of memory 113 and a cache 114, that are referred to as a level two (L2) memory subsystem 112. A traffic control block 110 receives transfer requests from a host processor connected to host interface 120b, requests from control processor 102, and transfer requests from a memory access node in DSP 104. The traffic control block interleaves these requests and presents them to the shared memory and cache. Shared peripherals 116 are also accessed via the traffic control block. A direct memory access controller 106 can transfer data between an external source such as off-chip memory 132 or on-chip memory 134 and the shared memory. Various application specific processors or hardware accelerators 108 can also be included within the megacell as required for various applications and interact with the DSP and MPU via the traffic control block.

External to the megacell, a level three (L3) control block 130 is connected to receive memory requests from internal traffic control block 110 in response to explicit requests from the DSP or MPU, or from misses in shared cache 114. Off chip external memory 132 and/or on-chip memory 134 is connected to system traffic controller 130; these are referred to as L3 memory subsystems. A frame buffer 136 and a display device 138 are connected to the system traffic controller to receive data for displaying graphical images. A host processor 120a interacts with the external resources through system traffic controller 130. A host interface connected to traffic controller 130 allows access by host 120a to external memories and other devices connected to traffic controller 130. Thus, a host processor can be connected at level three or at level two in various embodiments. A set of private peripherals 140 are connected to the DSP, while another set of private peripherals 142 are connected to the MPU.

Figure 2B:
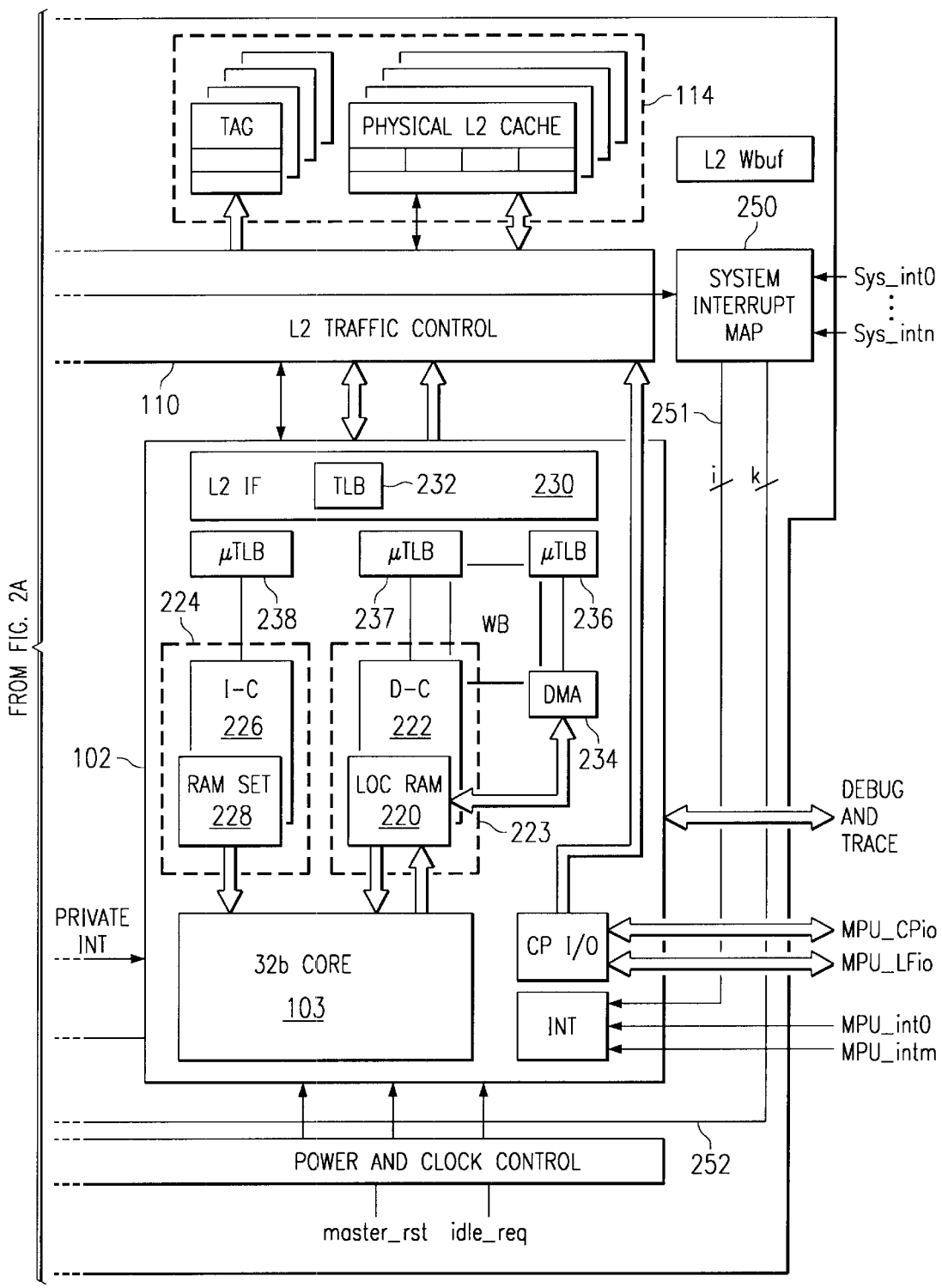

FIG. 2, comprised of FIG. 2A FIG. 2B together, is a more detailed block diagram of the megacell core of FIG. 1. DSP 104 includes a configurable cache 203 that is configured as a local memory 200 and data cache 202, and a configurable cache 204 that is configured as instruction cache 206 and a RAM-set 208, which are referred to as level one (L1) memory subsystems. The DSP is connected to the traffic controller via an L2 interface 210 that also includes a translation look-aside buffer (TLB) 212. A DMA circuit 214 is also included within the DSP. Individual micro TLBs (μTLB) 216–218 are associated with the DMA circuit, data cache and instruction cache, respectively.

Similarly, MPU 102 includes a configurable cache 223 that is configured as a local memory 220 and data cache 222, and a configurable cache 224 that is configured as instruction cache 226 and a RAM-set 228, again referred to as L1 memory subsystems. The MPU is connected to traffic controller 110 via an L2 interface 230 that also includes a TLB 232. A DMA circuit 234 is also included within the MPU. Individual micro TLBs (μTLB) 236–238 are associated with the DMA circuit, data cache and instruction cache, respectively.

L2 traffic controller 110 includes a TLB 240 and one or more micro-TLB (μTLB) 242 that are associated with system DMA block 106, host processor interface 120b for a host connected at level two, and other application specific hardware accelerator blocks. Similarly, L3 traffic controller 130 includes a μTLB controllably connected to TLB 240 that is associated with system host 120a at level three. This μTLB is likewise controlled by one of the megacell 100 processors.

Memory Management Unit

At the megacell traffic controller level, all addresses are physical. They have been translated from virtual to physical at the processor sub-system level by a memory management unit (MMU) associated with each core, such as DSP core 105 and MPU core 103. At the processor level, access permission, supplied through MMU page descriptors, is also checked, while at the megacell level protection between processors is enforced by others means, which will be described in more detail later.

The translation lookaside buffer (TLB) caches contain entries for virtual-to-physical address translation and page descriptor information such as access permission checking, cache policy for various levels, etc. If the TLB contains a translated entry for the virtual address, the access control logic determines whether the access is permitted. If access is permitted, the MMU generates the appropriate physical address corresponding to the virtual address. If access is not permitted, the MMU sends an abort signal via signal group 244 to the master CPU 102. The master CPU is identified by the value of the R-ID field. On a slave processor such as a hardware accelerator the R-ID is equal to the R-ID of the master CPU.

Upon a TLB miss, i.e., the TLB does not contain an entry corresponding to the virtual address requested, an exception is generated that initiates a translation table walk software routine. The TLB miss software handler retrieves the translation and access permission information from a translation table in physical memory. Once retrieved, the page or section descriptor is stored into the TLB at a selected victim location. Victim location selection is done by software or with hardware support.

Translation Table

To provide maximum flexibility, the MMU is implemented as a software table walk, backed up by TLB caches both at the processor sub-system and megacell level. This allows easy addition of new page size support or new page descriptor information if required. A TLB miss initiates a TLB handler routine to load the missing reference into the TLB. At the Megacell 100 level, a TLB miss asserts a miss signal in signal group 244 and is routed via system interrupt router 250 to the processor having generated the missing reference or to the processor in charge of the global memory management, via interrupt signals 251, 252.

Translation tables and TLB cache contents must be kept consistent. A flush operation is provided for this reason.

An address reference is generally located within the $\mu$TLB or main TLB of each processor sub-system; however, certain references, such as those used by system DMA 106 or host processor 120, for example, to access megacell memories can be distributed within L2 traffic controller 110 and cached into L2 system shared TLB 240 Because system performance is very sensitive to the TLB architecture and size, it is important to implement efficient TLB control commands to lock entries for critical tasks or unlock and flush those entries when a task is deleted without degrading the execution of other tasks. Therefore, each TLB and L2 cache entry holds a task-ID. Commands are supplied to flush locked or unlocked entries of a TLB/$\mu$TLB corresponding to a selected task.

As part of the page descriptor information, the MMU provides cacheability and bufferability attributes for all levels of memory. The MMU also provides a "Shared" bit for each entry to indicate that a page is shared among multiple processors (or tasks). This bit, as standalone or combined with the task-ID, allows specific cache and TLB operation on data shared between processors or/and tasks. The MMU may also provides additional information, such as access permission (AP) and memory access priority (MA_Priority) as described later.

All megacell memory accesses are protected by a TLB. As they all have different requirements in term of access frequencies and memory size, a shared TLB with individual $\mu$TLB backup approach has been chosen to reduce the system cost at the megacell level. This shared TLB is programmable by each processor. The architecture provides enough flexibility to let the platform work with either independent operating systems (OS) on each processors or a distributed OS with a unified memory management, for example.

The present embodiment has a distributed operating system (OS) with several domains corresponding to each processor but only a single table manager for all processors. Slave processors do not manage the tables. In a first embodiment, slave processor R-IDs are equal to the R-ID of the master CPU. In another embodiment, they could, however, have a different R-ID to control their TLB entries lock/unlock entries corresponding to some of their own tasks or flush all their entries, when putting themselves in sleep mode to free entries for the others processors. Having different R-ID provides a means to increase security in a concurrent multi-processor environment, processor X cannot access memory allocated to processor Y.

In another embodiment with several independent OS(s), for example, there will be independent tables. These tables can be located in a memory space only viewed by the OS that they are associated with in order to provide protection from inadvertent modification by another OS. As they manage the virtual memory and task independently, the R-ID provides the necessary inter-processor security. R-Ids are managed by a single master CPU. This CPU can make TLB operations on all TLB entries. TLB operation or memory accesses from slave processor are restricted by their own R-ID. The CPU master will have rights to flush out entries belonging to another processor in a different OS domain.

MMU/TLB Control Operation

FIG. 3 is a block diagram illustrating a shared translation look-aside buffer (TLB) 300 and several associated micro-TLBs ($\mu$TLB) 310(0)–310(n) included in megacell 100 of FIG. 2. On a $\mu$TLB miss, the shared TLB is first searched. TLB controller 320 is alerted by asserting a $\mu$TLB miss signal 324. In case of a hit on the shared TLB, the $\mu$TLB that missed is loaded with the entry content of the shared TLB 300. In case of miss in shared TLB 300, the shared TLB alerts TLB controller 320 by asserting a TLB miss signal 326. Controller 320 then asserts an interrupt request signal 328 to system interrupt controller 250. Interrupt controller 250 asserts an interrupt to the processor whose OS supervises the resource which caused the miss. A TLB entry register 330 associated with TLB controller 320 is loaded by a software TLB handler in response to the interrupt. Once loaded, the contents of TLB entry register 330 are transferred to both shared TLB 300 and the requesting $\mu$TLB at a selected victim location as indicated by arcs 332 and 334.

A separate TLB entry register 330 is only one possible implementation and is not necessarily required. The separate register TLB entry register is a memory mapped register that allows buffering of a complete TLB entry (more than 32 bits). A TLB value is not written directly in the TLB cache but is written to the TLB entry register first. Because of the size of an entry, several writes are required to load the TLB entry register. Loading of a TLB cache entry is then done in a single operation "Write TLB entry". Advantageously, other $\mu$TLBs associated with other modules can continue to access the shared TLB while the TLB entry register is being loaded, until a second miss occurs. Advantageously, by controlling access to the TLB via the TLB entry register, CPUs have no direct access to TLB cache internal structure and thus the risk of partial modifications inconsistent with the MMU tables is avoided.

The sequence of operations to update a TLB cache entry after a miss is:

1—the software TLB handler writes to the TLB entry register,

2—the software TLB handler sends a command to write the TLB entry, which transfers a value from TLB entry register to a preselected victim TLB cache entry; and 3—control circuitry checks and pre-selects a next victim TLB entry, in preparation for the next miss. In this embodiment, this step is generally performed in background prior to the occurrence of a miss.

Advantageously, TLB cache entries can be preemptively updated under OS software control to prevent TLB miss by pre-loading a new entry, using the following sequence of operation:

1—control circuitry checks and selects a TLB entry, referred to as a victim TLB cache entry.

2—the software TLB handler writes to the TLB entry register, and

3—the software TLB handler sends a command to write the TLB entry, which transfers a value from TLB entry register to the selected victim TLB cache entry.

The priority on the shared TLB is managed in the same way as priority on a memory access. One or more resources can be using the shared TLB. One or more resources can program the shared TLB. The replacement algorithm for selecting the next victim location in the shared TLB is under hardware control or software control through a master CPU. A victim pointer register 322 is maintained for each TLB and µTLB to provide a victim separate pointer for each. A typical embodiment will use a round robin scheme. Another embodiment may use a least recently used scheme or a random scheme, for example. In all cases, the eviction of any entry forces the replacement algorithm to use this TLB entry first until the TLB is full again. Different TLBs within a single megacell can use different replacement schemes. However, in an embodiment in which the system has a master CPU with a distributed OS, this master CPU could also bypass the hardware replacement algorithm by selecting a victim entry, reading and then writing directly to the Shared TLB.

In this embodiment, each shared TLB has 256 entries. Each µTLB is generally much smaller, i.e., has fewer entries, than the shared TLB. In various embodiments, each shared TLB has 64–256 or more entries while ∥TLBs generally have 4–16 entries. The penalty for a miss in a µTLB is small since a correct entry is generally available from the shared TLB. Therefore, the present embodiment does not provide direct control of the victim pointers of the various µTLBs; however, direct control of the victim pointer of shared TLBs, such as 212, 232, and 240, is provided.

Each entry in a TLB has a resource identifier 301 along with task-ID 302. Resource-IDs and task IDs are not extension fields of the virtual address (VA) but simply address qualifiers. Resource IDs are provided by a resource-ID register associated with each requester resource; such as R-ID register 342a associated with resource 340 and R-ID register 342n associated with resource 350. Resource 340 is representative of various DMA engines, coprocessor, etc within megacell 100 and/or an external host connected to megacell 100. Resource 350 is representative of various processors within megacell 100. Each resource 340, 350 typically has its own associated R-ID register; however, various embodiments may choose to provide resource ID registers for only a selected portion of the resources. A task ID is provided by a task-ID register, such as task-ID register 344a associated with resource 340 and task-ID register 344n associated with resource 350. A task register associated with a non-processor resource, such as DMA, a coprocessor, etc, is loaded with a task value to indicate the task that it is supporting.

In another embodiment, only processor resources 340, 350 that execute program modules have an associated programmable task-ID register. In this case, a system wide default value may be provided for access requests initiated by non-processor resources such as DMA. The default value may be provided by a programmable register or hardwired bus keepers, for example.

Advantageously, with the task-ID, all entries in a TLB belonging to a specific task can be identified. They can, for instance, be invalidated altogether through a single operation without affecting the other tasks. Advantageously, the resource ID permits discrimination of different tasks being executed on different resources when they have the same task number. Task-ID number on the different processors might not be related; therefore, task related operations must be, in some cases, qualified by a resource-ID.

In another embodiment, the R-ID and Task-ID registers are not necessarily part of the resource core and can be located elsewhere in the system, such as a memory mapped register for example, and associated to a resource bus. The only constraint is that a task-ID register related to a CPU must be under the associated OS control and updated during context switch. R-ID must be set during the system initialization. In some embodiments at system initialization, all R-ID and Task-ID registers distributed across the system are set to zero, which is a default value that causes the field to be ignored. In other embodiments, a different default value may be used. In other embodiments, R-ID "registers" provide hardwired values.

In yet another embodiment, the R-ID and/or task-ID registers are not implemented. In this case, the TLB does not contain R-ID and/or task-ID fields in the page entries and the attendant advantages are not realized. However, aspects of the present invention can still be implemented in such an embodiment.

Referring still to FIG. 3, each TLB entry includes a virtual address field 305 and a corresponding physical address field 308 and address attributes 309. Address attributes define conditions or states that apply to an entire section or page of the address space that is represented by a given TLB entry. An S/P field 306 specifies a page size. In the present embodiment, an encoding allows page sizes of 64 kb, 4 kb and 1 kb to be specified. Naturally, the page size determines how many most significant (ms) address bits are included in a check for an entry.

Each TLB entry also includes "shared" bit 303 and a lock bit 304. All entries marked as shared can be flushed in one cycle globally. A V field 307 indicates if an associated TLB cache entry is valid. V field 307 includes several V-bits that are respectively associated with R-ID field 301 to indicate if a valid R-ID entry is present, task-ID field 302 to indicate if a valid task-ID entry is present, and virtual address field 305 to indicate if a valid address entry is present. These valid bits enable the compare logic with their associated field.

As mentioned earlier, the resource ID field and task ID field in each entry of the TLB/µTLB can be used to improve security. During program task execution, each transaction request is checked by the miss control circuitry of the TLB/µTLB to determine if the entry is allowed for a specific resource or for all resources and for a specific task or for all tasks. For example, if a request is received and a valid entry is present for the proffered virtual address but a task ID or R-ID which accompany the request does not match the corresponding valid task ID and R-ID fields of the entry, then a miss is declared. If the task ID and/or R-ID fields of the entry are marked as invalid, then they are ignored.

Shared Cache and RAM

Referring again to FIG. 1, Megacell 100 includes large shared memory subsystem 112 that function as a secondary level of RAM (L2 RAM) 113 and cache (L2 Cache) 114. This level of memory is preferably called the outer level, as each processor in various embodiments may have multilevel internal memory. However, for the present embodiment, processors 102, 104 have one level of internal memory, which is referred to herein as L1 within the memory hierarchy, therefore the outer level memory subsystem will be referred to as level two (L2). The megacell outer memory 112 is organized as what's called a SmartCache, which is a configurable cache and which allows concurrent accesses on cache and RAM-set. RAM-set is a block of RAM that has aspects of cache behavior and cache control operations as well as DMA capability. The SmartCache architecture provides predictable behavior and enhanced real-time performance while keeping high flexibility and ease of use. A detailed description of a SmartCache is provided in U.S. patent application Ser. No. 09/591,537, entitled Smart Cache and is incorporated herein by reference. Advantageously, RAM-set configured as a RAM offers fast memory scratchpad feature.

Megacell "outer" memory 112 can be shared between megacell internal processors and external Host processors or peripherals. RAM usage can also be restricted to the usage of a single processor thanks to the MMU mechanism, described earlier. However, in another embodiment a need might arise in the megacell to add additional physical protection per processor on some part of megacell memory to overwrite the MMU intrinsic protection.

A unified shared cache architecture of this embodiment is a four way set associative cache with segmented lines to reduce system latency. All outer memories are treated as unified instruction/data memory to avoid compiler restrictions such as data in program space or vice-versa. Size of this cache or the degree of associativity is a design choice and may vary in other embodiments of the present invention. General construction of set-associative caches are known and need not be described in detail herein. Typically, L1 caches are 16 kbytes or 32 kbytes, and the L2 cache is 128 kbytes, 256 kbytes or larger, for example. Likewise, the number of associated RAM-sets may vary in other embodiments.

RAM-set control registers, such as control register 531 in cache control circuitry 530 (FIG. 4), are memory mapped and therefore also benefit from the protection provided by the MMU. However, this would force operations on cache or any specific RAM-set to be on separate pages for protection reasons. Therefore, a control register is provided in TLB control register set 323 (FIG. 3) to configure how and by which CPU the various parts of megacell memory are controlled. All CPUs can execute operations such as cache flushing or cache cleaning as these operations will be restricted by a resource identifier field located in the TAG area of the cache.

FIG. 4 is a block diagram illustrating a representative configurable cache 500 that has a cache representative of L2 cache 114 and a RAM-set representative of shared RAM 113. Configurable cache 500 is also representative of L1 cache 203, 204, 223, and 224 that are included respectively in each of the processor modules 102, 104 of FIG. 2; however, in the present embodiment, each L1 cache has only a single segment per line. As discussed above, the configurable cache is composed of a 4-way set-associative cache that includes a TAG Array 502(0–3) and Data array 506 (2–5) and one or more additional RAM-sets, in this case data arrays 506(0–1). In the present embodiment, data array 506(1–5) are each 32 kbytes, while data array 506(0) is 64 kbytes.

During an access request, each TAG array 502(0–3) provides a tag value to a respective comparator 546(0–3) and is compared against a most significant portion of a proffered address 548. A tag value is stored in tag array 502(0–3) according to an index value that corresponds to a least significant address of a proffered address. Thus, for any proffered address, an associated tag may be found on anyone of the four tag arrays. If a tag matches a proffered address, then hit/miss logic 510 asserts a respective hit signal hit-way(2–5) 514. In this embodiment, a resource ID (R-ID) field 520 and a task ID (task-ID) field 522 is also included with each entry in the tag array, along with a set of valid bits VI(1–4). Usage of these fields will be described in more detail later. Prefetch circuitry 516 receives signals 512–514 and forms a request to L3 memory when a miss occurs. For each hit, the requested data is provided via bus 541b to an output port of the cache via cache output buffer 540b. In certain embodiments, an L1 cache may have task-ID and R-ID fields, while in other L1 cache embodiments these fields may be omitted.

The RAM-set also includes valid bit arrays 504(0–1) The RAM-set can be configured as a cache extension or as a block of RAM. When configured as RAM, a loading mechanism is provided by a separate DMA engine to optimize data transfer required by multimedia applications. For each hit in the RAM-set portion of the cache, requested data is provided via bus 541a, a second output port of the cache, via cache output buffer 540a. Alternatively, bus 541a and 541b may be connected together such that the cache has only a single output port.

Cache control circuitry 530 includes control registers 531. Cache control circuitry 530 also includes cache monitoring circuitry 532 with a set of counters. A miss counter 532a is connected to receive hit/miss signal 514 and increments each time a qualified cache miss occurs. A second counter records the number of cache accesses in order to compute cache miss rate. These counters can be reset under software control and used to record cache miss statistics during program execution. Monitoring circuitry 532 will be described in more detail with respect to FIG. 7A. Its use will be described in more detail with respect to FIG. 9.

In the embodiment of FIG. 4, the RAM-set has two different sized data arrays, Data array 506(0) is 64 kbytes and Data array 506(1) is 32 kbytes; however, other embodiments may specify all RAM-sets with the same size to simplify the hardware logic and the software model.

Each RAM-set has an associated TAG register, referred to as Full Set Tag 508(0–1) containing the base address of the RAM-set and a global valid bit (VG) 509(0–1) in addition to an individual valid bit contained in valid bit arrays 504(0–1), referred to as VI, for each segment of each segmented line in the associated data array. Each segment may also have a dirty bit referred to as DI, not shown on this figure. In the present embodiment, RAM-set lines have the same size as the cache lines; however, in other embodiments a longer line size can also be used to reduce the number of VI bits. RAM-set base registers are coupled with a logical comparison 542(0–1) on a most significant address portion 544 for each access request.

An organization field in cache control register (RAMset-ctrl[n]) 531 for each RAM-set provides the capability to configure it as a cache extension (RAM-set) or as a plain RAM. When configured as a plain RAM, the valid bits are ignored. Table 1 explains other fields in this register.

TABLE 1

| Cache Control Register | |
| --- | --- |
| Bit[0] | 0/1 RAM-set 0 operates as a cache or as a RAM |
| Bit[1] | 0/1 RAM-set 1 operates as a cache or as a RAM |
| DMA mode bit | When set, block operations operate in DMA mode |
| Fill Mode | Line by line fill, or complete block fill |

For L2 caches, there is another control word that indicates which CPU can configure the RAM-set behavior of each L2 RAM-set. This control word is memory mapped and accessible only to the MPU master. For example: Bit[0]: 0/1 CPU master/DSP master for RAM set 0. A status register (not shown) connected to cache control circuitry 530 provides cache information, including number of RAM-sets, sizes, Cache number of way, and line size.

When configured as a RAM, base address registers 508 (0–1) are programmed such that this memory does not overlap with other memories in the system. Note, the base address register and the full set tag register are the same. This memory space is mapped as non-cacheable at the outer level. RAM control logic (address decode) generates a hit equivalent signal, which prevents the outer cache from fetching the missing data/instruction to the external memory. VG bit 509(0–1) acts as an enable/disable. It is set when the base address register is written to and cleared when the RAM is invalidated or disabled.

If the register base address of the RAM is programmed in such a way that the associated memory area overlays with the external memory, coherency is not guaranteed by hardware of this embodiment.

When configured as a cache, hit/miss control circuitry 510 generates hit/miss signals called hit—hit 512 and hit-miss 513 for each RAM-set. A hit—hit is generated when a valid entry of the RAM-set matches the address provided by the core. An entry is valid when both VG and its VI are set. A hit-miss signal is generated when the base address of the RAM is valid (VG=1) and matches the most significant portion of an address provided by a processor but the selected entry in the RAM-set has its VI equal to zero.

The hit-miss or hit—hit signal has precedence over the hit way (2–5) signals 514 of the 4-way set-associative cache. This implies that any value loaded previously in the cache that should be in the RAM-set is never selected and will eventually be removed from the cache. However, data can create coherency problem in case of modified data (copy back). Therefore, it is recommended to write back ("clean") or even flush the range of address that will correspond to the RAM-set range of addresses. Other embodiments might not have such precedence defined and instead rely on cache invalidate operations to correctly prepare an address range that will be programmed to reside in a RAM-set, for example.

Figure 5:
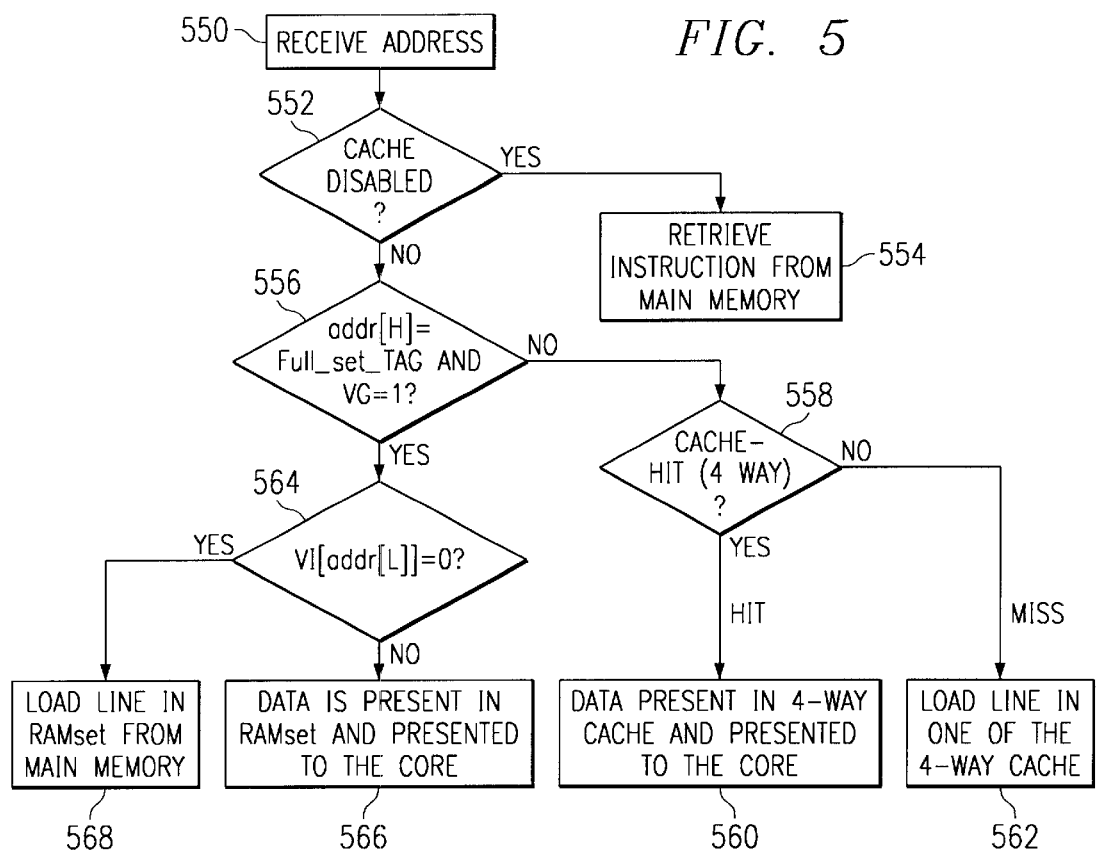
FIG. 5 is a flow chart illustrating operation of the hit/miss logic of the configurable cache of FIG. 4.

FIG. 5 is a flow chart illustrating operation of the hit/miss logic of the configurable cache of FIG. 4. In step 550, an address is received from the processor core in connection with a read operation. If the instruction/data cache is disabled, which is checked in step 552, the instruction/data is retrieved from second level memory in step 554. If the cache is enabled, then if either the high order bits of the address from the processor (ADDR[H]) do not match the high order bits of the starting address 508(n) or the global valid bit 509(n) is set to "0" (step 556), then there is a RAM-set miss. In this case, if there is a cache hit in the 4-way set associative cache in step 558, then the information is retrieved from the 4-way set associative cache is presented to the core processor via cache output buffer 540b. If there is a miss in the 4-way set associative cache, the line is loaded into the 4-way cache from second level memory. Also, each miss in the cache is recorded by incrementing miss counter 532.

Returning again to step 556, if both the high order bits of the address from the processor (ADDR[H]) match the high order bits of the starting address 508(n) and the global valid bit 509(n) is set to "1", then there is a RAM-set hit at the line corresponding to ADDR[L], and the valid entry bits are used to determine whether it is a hit—hit situation where the requested instruction is present in the RAM-set and can be presented to the processor, or a hit-miss situation where the requested instruction is mapped to the RAM-set, but the information needs to be loaded into the RAM-set's data array 506(n) from the second level memory. If, in step 564, the individual valid entry bit (VI) 504(n) for the line indicates that the line is valid (VI[ADDR[L]]=1), the instruction is present in the RAM-set and is presented to the processor through the RAM-set's output buffer 540a. If, on the other hand, the valid entry bit for the line indicates that the line is not valid (VI[ADDR[L]]=0), the line is loaded into the data array 506(n) of the RAM-set from main memory in step 568. In this embodiment, a miss in the RAM-set is not recorded in miss counter 532. However, in another embodiment, a separate RAM-set miss counter could be provided, or statistics form the RAM-set could be combined with statistics from the cache.

Figure 6:
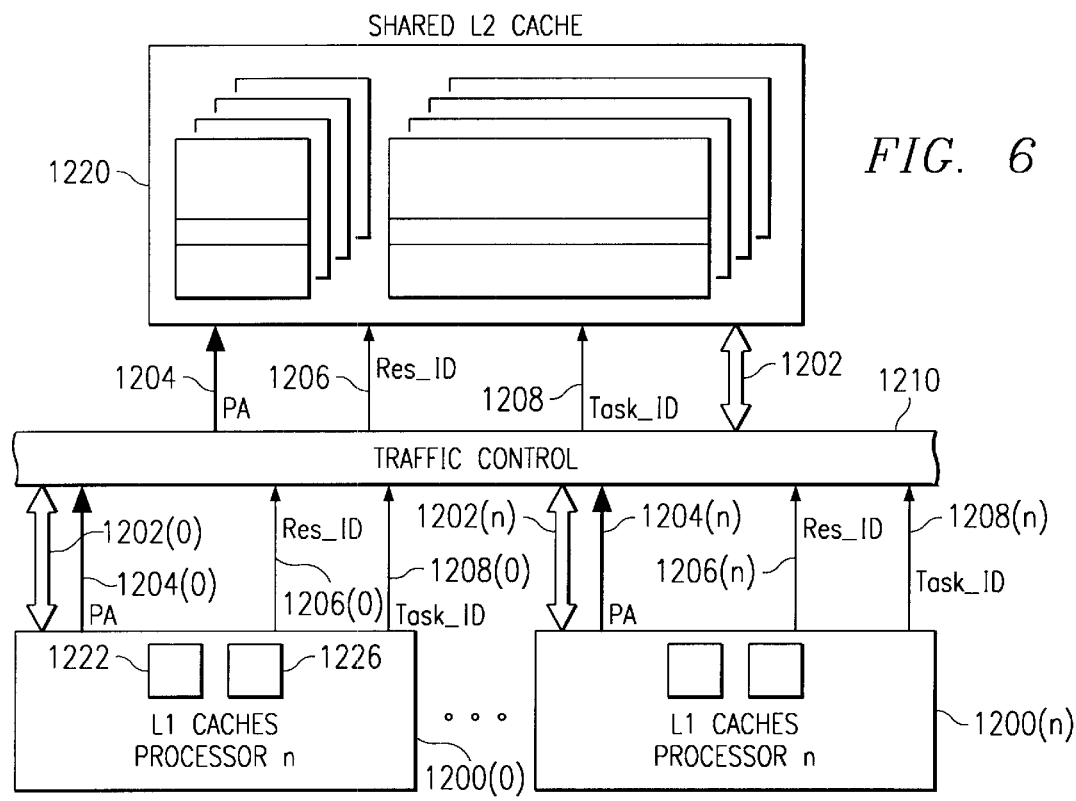
FIG. 6 is a more detailed block diagram illustrating various inter-connections between processors and the L2 cache of FIG. 1.

FIG. 6 is a more detailed block diagram illustrating various inter-connections between processors 1200(0-n) and L2 cache 1220, representative of the L2 cache of FIG. 1. A data bus 1202(n), physical address bus 1204(n), resource ID signals 1206(n), and task ID signals 1208(n) provided by each processor 1200(n) for each L2 request. Recall from earlier description that TLBs associated with each requester provides the physical address and resource/task ID signals for each request. Traffic controller 1210 provides request priority selection and sends the highest priority request to L2 cache 1220 using data bus 1202, physical address bus 1204, resource ID signals 1206, and task ID signals 1208 to completely identify each request. In the present embodiment, TLBs are used to convert virtual address to physical address and also respond to task ID and resource ID, as described with earlier.

In another embodiment, a TLB may not be needed and will therefore not provide the physical address and resource/task ID signals for each request. In that case, address signals and resource/task ID signals are provided directly from registers associated with the requesting device, for example.

Figure 7A:
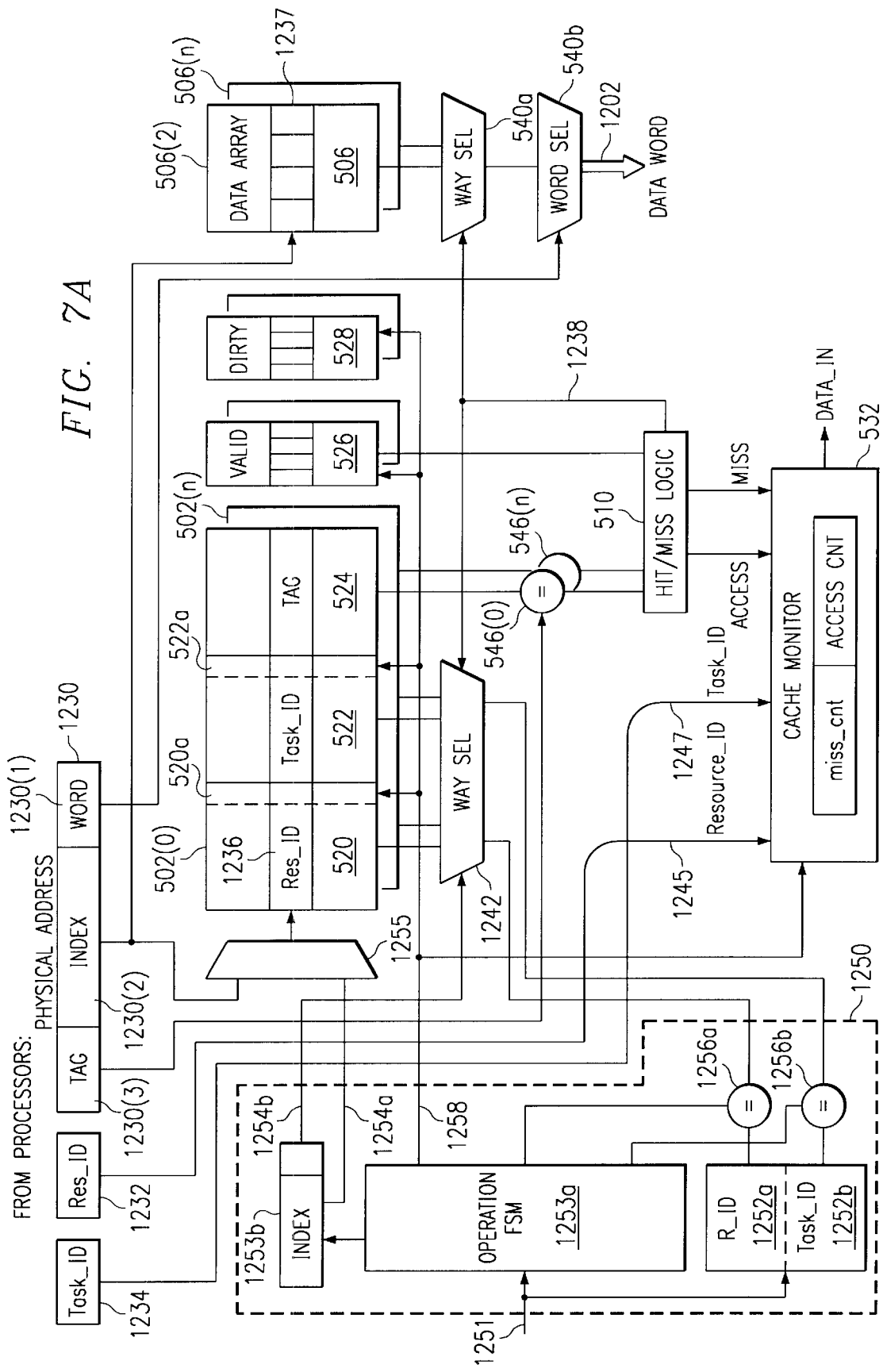
FIG. 7A is a more detailed block diagram of the L2 cache of FIG. 6, illustrating tag circuitry with task ID and resource ID fields and cache monitoring circuitry, according to an aspect of the present invention.

FIG. 7A is a more detailed block diagram of the L2 cache of FIG. 6, illustrating tag circuitry with task ID and resource ID fields and cache monitoring circuitry 532, according to an aspect of the present invention. As discussed earlier, the shared multiprocessor L2_cache architecture has a task_ID field 522 and Resource_ID field 520. Adding these qualifier fields to the shared level-2 cache identifies all entries belonging to a task and/or to resource.

For each memory access request, a proffered physical address 1230 received on address bus 1204 is treated has having a tag portion 1230(3), an index portion 1230(2) and a word portion 1230(1), as is commonly understood for set associative caches. In addition, a resource ID field 1232 is received on bus 1206 and a task ID 1234 is received on bus 1208.

Referring still to FIG. 7A, in a dynamic system environment and at fortiori in a multi-processor system with shared memory cache, it becomes advantageous due to the cache size to have selective control over the cache to improve performance and reduce power consumption. Task-ID 522 and resource-ID 520 have been added to the TAG array as a qualifier field for cache operations, such as flush (invalidate), clean or even lock/unlock. All entries of the shared system cache belonging to a task or respectively to one of the system resources (CPU, coprocessors, etc.) can be identified within a single cache command. Advantageously, a task which ends or is terminated can be removed and thereby create free spaces in the cache. This minimizes eviction of useful entries of active tasks and thereby reduces power consumption because the replacement algorithm is updated accordingly to point to the freed entries.

Table 2 includes a listing of the various cache and RAM control operations that can be invoked by the processors in the megacell of the present embodiment. In this embodiment, all operations on an entry operate on segments; there are four segments per entry in the L2 cache, as discussed above. When applied to L1 caches which are segregated into a data cache and a separate instruction cache, then the flush, clean and prefetch operations are directed to the type of information contained in the targeted cache. This means that a way is provided to identify on which cache, instruction or data, a command such as flush applies.

finite state machine (FSM) 1253a and index counter 1253b operate together to sequentially select each and every tag entry in tag array 502(0-n) by using most significant bits 1254a as an index value into the tag array. The least significant bits 1254b of counter 1253b are connected to way-select mux 1242 to sequentially select each tag array of a multiple set array. Comparators 1256a, b are connected to receive the qualifier fields of the selected tag entry and compare them to the specified qualifier value(s) in latches

TABLE 2

Cache and RAM Control Operations
(C: operation on the cache, RS: operation on RAM-set, R: operation on RAM)

| Function | | Software view (memory mapped/ co-proc) |
|---|---|---|
| Flush_entry (address) | C/RS | Flush the entry[1], whose address matches the provided address or a Range of addresses, if End has been set previously. Flush-range instruction is made of two consecutive instructions Set_End_addr(address) + Flush_entry (address). |
| Flush_all_entry_of_task_ID(task_ID) | C | Flush all entries matching to the current taskID in the cache but not in the RAM-set |
| Flush_all_entry_of_R_ID_(task_ID) | C | Flush all entries matching to the current R_ID in the cache but not in the RAM-set |
| Flush_all | C | Flush all entries in the cache but not in RAM-set |
| Flush_all_shared | C | Flush all entries marked as shared |
| Flush_all_task_ID_shared(task_ID) | C | Flush all entries matching the current taskID and marked as shared |
| Flush_all_task_ID_not_shared (task_ID) | C | Flush all entries matching the current taskID and marked as not shared |
| Clean_entry (address) | C/RS | Clean the entry[1], whose address matches the provided address or a Range of address if End has been set previously. Clean-range instruction is made of two consecutive instructions Set_End_addr(address) + Clean_entry (address). |
| Clean_all_entry_of_taskID(task_ID) | C | Clean all entries matching to the current taskID in the cache but not in the RAM-set |
| Clean_all_entry_Of_R_ID(task_ID) | C | Clean all entries matching to the current R_ID in the cache but not in the RAM-set |
| Clean_all | C | Clean all entries in the cache but not in RAM-set |
| Clean_all_shared | C | Clean entries marked as shared |
| Flush_all_task_ID_shared(task_ID) | C | Flush all entries matching the current taskID and marked as shared |
| Clean_all_taskID_not_shared(Task_ID) | C | Clean all entries matching the current taskID and marked as not shared |
| Clean&Flush_single_entry(address) | C/RS | Clean and flush the entry[1], whose address matches the provided address or a Range of address if End has been set previously. Clean-range instruction is made of two consecutive instructions Set_End_addr(address) + Clean_entry (address). |
| Clean&flush_all_entry_of_taskID (Task_ID) | C | Clean and flush all entries matching to the current taskID in the cache but not in the RAM-set |
| Clean&flush_all_entry_of_R_ID (Task_ID) | C | Clean and flush all entries matching to the current R_ID in the cache but not in the RAM-set |
| Clean&flush_all | C | Clean and flush all entries in the cache but not in RAM-set |
| Clean&flush_all_shared | C | Clean and flush entries marked as shared |
| Clean&flush_all_taskID_shared (task_ID) | C | Clean and flush all entries matching the current taskID and marked as shared |
| Clean&flush_all_taskID_not_shared (task_ID) | C | Clean and flush all entries matching the current taskID and marked as not shared |
| Set_RAM_Set_Base_addr(RAM-setID) | RS/R | Set new RAM-set base address, set VG and clear all VI and set End to last RAM-set address by default preparing the full RAM-set loading. In that case no need to write the END address before writing the start address to load the RAM-set |
| Set_End_Addr (address) | C/RS | Set end address of the next block load and set the RAM-set controller in block fill mode. |
| Set_start_addr (address) | C/RS | Set start address of a block and initiates the loading of this block |
| Prefetch-entry(address With optional lock | C/RS | Prefetch-the entry, whose address matches the provided address or a Range of address if End has been set previously. Prefetch-range instruction is made of two consecutive instructions Set_End_addr(address) + Prefetch_entry (address). Lock entry if address lsb = 1 |
| Flush_RAM-set (RAMset_ID) | RS/R | Clear VG and all VI of the selected RAM-set |

Referring still to FIG. 7A Control circuitry 1250 receives an operation command on control port 1251 from one of the processors in the megacell. The command specifies a particular qualifier value that is to be used for the operation and this is stored in R-ID latch 1252a, and/or task-ID latch 1252b. The control circuitry has outputs 1254a, b connected to the tag array to select a tag entry. Operation command

1252a, 1252b. If there is a match, then appropriate modification signals 1258 are asserted to modify the selected tag entry according to the operation command.

For example, on detection of the command "flush_all_entry_related_to_task_ID" issued by the MPU, a hardware counter 1253b is incremented to search all the L2_cache and the command flushes all entries belonging to the given task identifier (task-ID) or/and to the given resource identifier (R-ID) by turning off an associated valid bit 526. At each iteration of the hardware loop, the task-ID, or/and respectively the R-ID, field is compared with the task-ID, or/and respectively the R-ID, provided through the command. In case of match, the entry is flushed out. Similarly, the system supports clean and clean&flush operations based on task-ID field and R-ID field. A "clean" operation writes an entry out to backup memory if the associated dirty bit 528 is set.

In another embodiment, this fast hardware looping mechanism is also applied to a one-bit field called "shared". Similarly, all entries marked as "shared" can be cleaned or flushed out through a single command. A shared bit is included with each tag entry in the tag array. Each proffered request includes a shared value that is provided by a TLB that translates the address for each request.

In another embodiment, other types of qualifier fields may be included within the tag entry.

In an embodiment that has qualifier field validation, such as a valid bit or invalid value, for example, an invalid qualifier field is ignored. Therefore, tag entries with invalid entries will be ignored. However, in this case, a command to modify tag entries with invalid qualifiers may be provided.

In another embodiment, a task ID could also be applied to an L1 cache to allow cleaning and flushing of an L1 cache based on task ID; however, for a small cache size there may not be sufficient benefit.

The master CPU, or any CPUs in the system within their R-ID limits, can initiate these commands. Ordinary accesses, resulting from an L1-miss, will stall these commands. After an L1 miss is satisfied, the stalled command is then automatically resumed.

In this embodiment, a hardware loop controlled by a single command is provided by state machine 1253a under control of the MPU to clean or flush all entries of a given task. In some embodiments, slave CPUs will have the capability to execute cache operations based on their own task-id and restricted by their R-Id field. Alternatively, control circuitry can be provided to perform a flush operation in a simultaneous manner for all entries, rather than operating in a looping manner, using a content addressable memory circuit, for example. Likewise, multiple entries could be cleaned in parallel by providing sufficient write buffer space.

In another embodiment, the control operations can be invoked by executing an instruction that invokes a hardware or software trap response. As part of this trap response, a sequence of instructions can be executed or a control word can be written to selected address, for example. In another embodiment, one of the processors may include instruction decoding and an internal state machine(s) to perform a TLB or Cache control operation in response to executing certain instructions which may include parameters to specify the requested operation.

Further description of cache flushing and cleaning based on task-ID/R-ID is provided in U.S. Pat. Ser. No. 09/932,363 which is incorporated herein by reference.

Figure 7B:
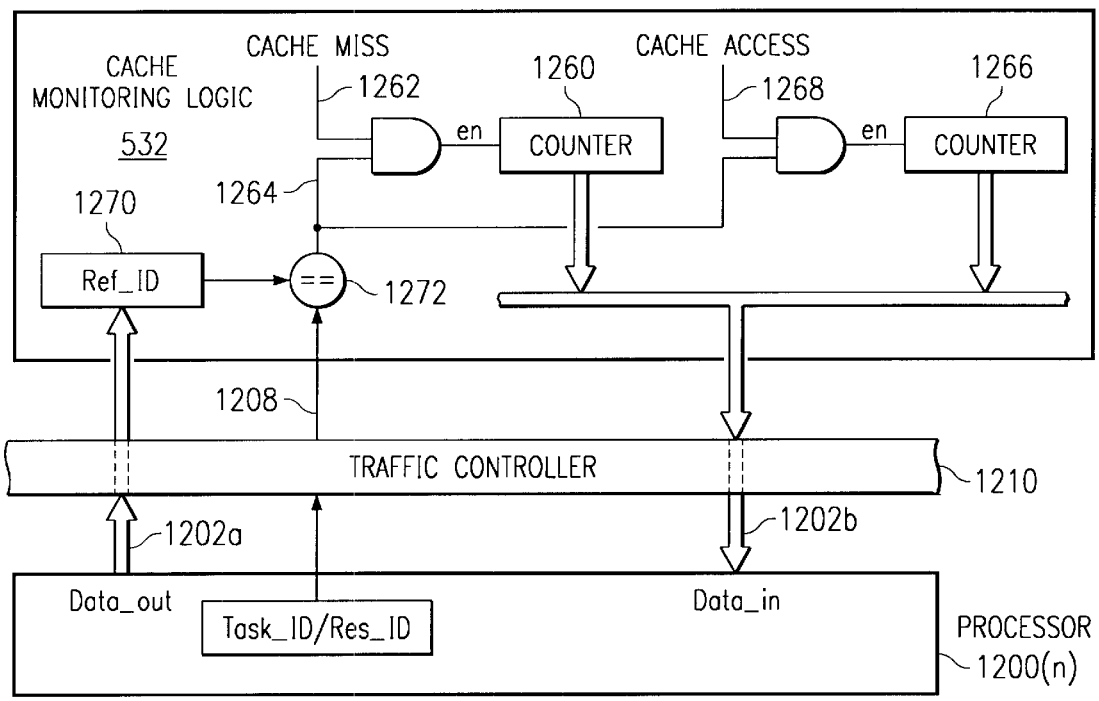
FIG. 7B is a more detailed block diagram of the cache monitoring circuitry of FIG. 7A.

FIG. 7B is a more detailed block diagram of the cache monitoring circuitry of FIG. 7A. Miss counter 1260 is connected to receive cache miss signal 1262 and increments each time a qualified miss occurs, as indicated by signal 1264 being asserted. Access counter 1266 is connected to receive cache access signal 1268 and increments each time a qualified access to the cache is made, as indicated by signal 1264 being asserted.

Reference-ID latch 1270 is loaded with a selected task-ID value and R-ID value to identify a task that is to be monitored. Comparison circuit 1272 is connected to receive task-ID/R-ID signals 1208 from processor 1200(n) that accompany each cache access request. Processor 1200(n) is representative of one or more resources that access the L2 cache of FIG. 7A. If the proffered qualifier signals 1208 match the monitored-qualifier value stored in latch 1270, then signal 1264 is asserted to indicate the current access request is qualified.

A processor 1200(n) can access miss counter 1260 and access counter 1266 via data bus 1202b in a periodic manner and thereby calculate a dynamic miss rate for a task identified by the value stored in reference-ID latch 1270.

Various embodiments of the present invention may include different configurations of cache monitoring circuitry. For example, the reference latch and counter can be replicated so that two or more tasks can be monitored simultaneously. Alternatively, in a single processor system, the resource ID field may not be implemented.

In another embodiment, a threshold value latch is provided for indicating a miss rate threshold and timing circuitry is provided such that the counters are reset on a periodic basis in order to generate a miss rate. If a counter exceeds a miss rate threshold, then control circuitry can assert an interrupt signal that indicates that the system may need to be reconfigured due to an excessive miss rate, for example.

Figure 8:
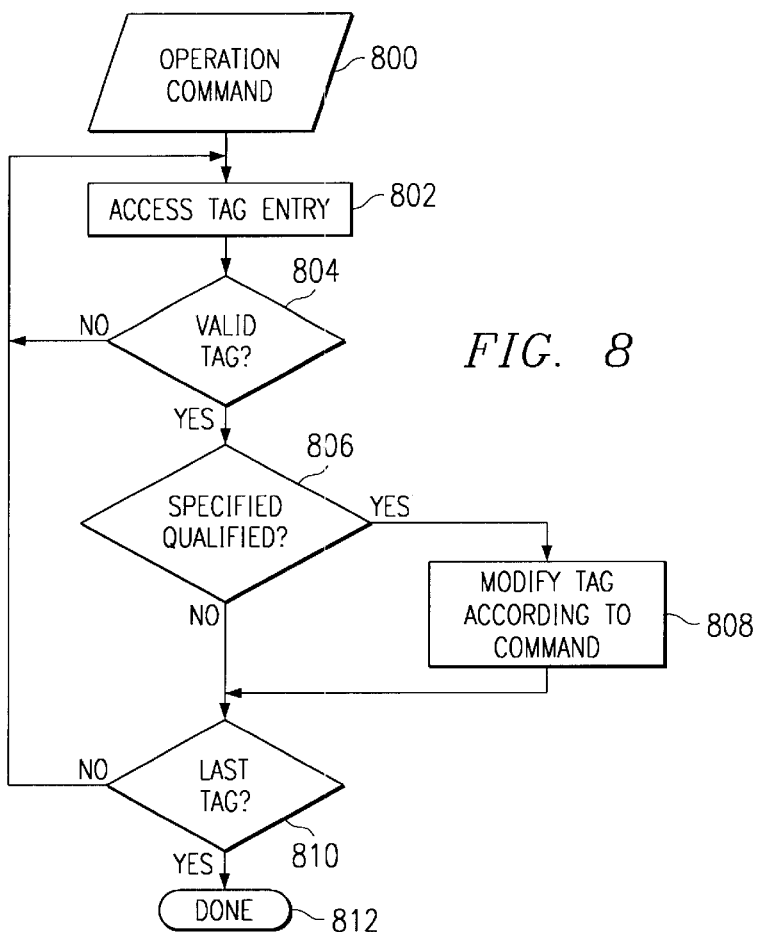
FIG. 8 is a flow chart for an operation command on the cache that is responsive to qualifier fields in the cache tag entries.

FIG. 8 is a flow chart for an operation command on the cache that is responsive to qualifier fields in the cache tag entries. In step 800, an operation command is received from control processor 102. As discussed earlier, operation commands are described in Table 2. One or more specified qualifier fields are received with the command. An operation command is generally performed after the cache has been in operation for a period of time and the tag entries have been filled.

In step 802, a selected tag entry is accessed. Upon receipt of the operation command, an index counter is initialized with a first index value, typically zero. Thus, a tag entry corresponding to index zero is accessed.

In step 804, a valid bit 526 associated with the selected tag entry is checked. If the tag entry is invalid, then the process returns to step 802 and accesses the next tag. If the tag is valid, then the qualifier field(s) are compared to the specified qualifier provided with the operation command in step 806. Each resource ID entry and task ID entry is validated before being acted upon. If either or both qualifier fields for a given entry are not valid, then it is ignored. In this embodiment, either or both of the resource ID and task ID fields can be specified to control the operation. In step 806, the validity of the qualifier fields is also checked by examining a valid indicator associated with each qualifier field. If a qualifier field is not valid, then it is ignored.

In step 808, if the qualifier field(s) match, then the tag entry is modified in accordance with the operation. For example, if the operation is "flush_all_entry_of_task_ID (task_ID)," then all valid bits 526 for the selected tag entry are turned off. For another example, it the operation is "Clean_all_entry_of_taskID(task_ID)," then a modification signal is asserted to cause control circuitry of the cache to perform a clean cycle the selected tag/data entry by examining dirty bits corresponding to the selected entry and writing "dirty" data to main memory. The dirty bit(s) is then turned off.

In step 810, a check is made to determine if the last tag has been accessed. The loop is repeated until all tags have been checked and all tag entries that have qualifier fields that match the specified qualifier value have been modified according to the specified operation. In this embodiment, a finite state machine is configured with the index value size of the tag array. This is used to determine the last tag. In another embodiment, the first and last tag value may be configured under control of software so that a software controlled range of tags can be operated on.

Figure 9:
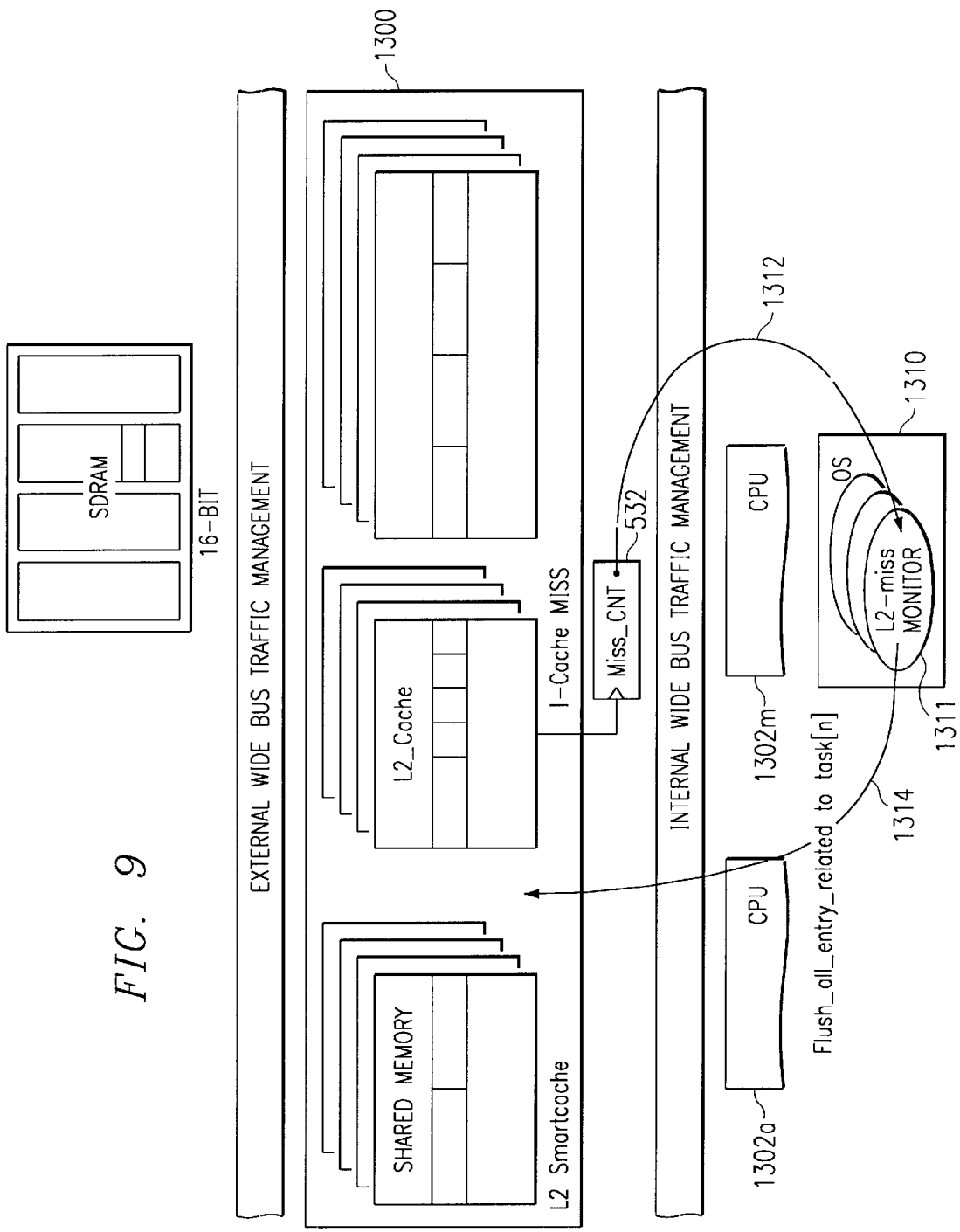
FIG. 9 is a flow diagram illustrating determination of cache miss rate using the monitoring circuitry of FIG. 7B within the megacell of FIG. 2, according to aspects of the present invention.

FIG. 9 is a flow diagram illustrating determination of cache miss rate using the monitoring circuitry of FIG. 7B within the megacell of FIG. 2, according to aspects of the present invention. The system has a cache 1300 with an associated miss counter 532 for determining a dynamic miss rate, so that an aspect of the system can be reconfigured if the miss rate exceeds a threshold value. One way of reconfiguring the system is to flush the cache to remove entries of tasks that have been suspended or terminated. This can be done without monitoring each time that the OS terminates a task. By flushing the cache in this manner, entries can be freed so that useful entries are not evicted to satisfy a miss. For large caches the penalty to clean or flush is high even if only the entries corresponding to a task or resource are considered; therefore, flushing is generally deferred for a period of time. If the cache is not flushed at some point of time, the miss rate may increase. Therefore, in the current embodiment, OS 1310 periodically monitors miss rate counter (Miss_CNT) 532 located in cache control circuitry 530 (see FIG. 7) of shared L2 cache 1300. A background monitoring task 1311 accesses miss counter and an access counter in monitoring circuit 532 as indicated by arc 1312 and uses the miss statistic and access statistic to determine a miss rate. These counters are enabled by the comparison of the current task id and R-id signal coming from the requesters and the reference values held in the hardware monitoring block shown in FIG. 7B. For each counter, a count can be calculated by determining a difference between two readings over an intervening time period. Alternatively, the counters can be periodically reset, for example.

Monitoring task 1311 compares the current miss rate to a pre-selected threshold value. If the threshold value is exceeded, then the monitoring task sends a flush_all_entry_of_task_ID command 1314 to L2 cache 1300 to flush all entries of one or more selected tasks, typically a recently terminated or suspended task. In order to support this, OS 1310 maintains a list of recently suspended and terminated tasks. Likewise, the OS maintains of list of recently inactivated resources, such as a coprocessor. When the miss rate threshold is exceeded, if a resource has been recently inactivated, then all entries associated with that resource are flushed by sending a flush_all_entry_of_R_ID command to L2 cache 1300.

Advantageously, by flushing all entries associated with a given task that is no longer being executed the cache is less likely to thrash and the miss rate is thereby reduced. For example, the present cache is embodied as a four way set associative structure. When a miss occurs on a given line, a victim line is selected for eviction based on a replacement algorithm. This algorithm can be LRU, pseudo LRU (3 bits per line) or 2 bits per line random or cyclic counter. In all cases, a line may be evicted that will again be needed which induces another miss. By flushing entries of a task that has been suspended or terminated and forcing the replacement algorithm to point to the freed line (invalid) after a flush operation, the risk of a miss after an eviction for all of these entries is eliminated, thereby lowering miss rate.

When monitoring task 1311 sends a command to flush selected entries of L2 cache 1300, it also sends similar commands to the shared TLB (see FIG. 3) to flush TLB entries according to a specified task-ID or resource-ID that is associated with the flushed cache entries in order to reduce the TLB miss rate. In another embodiment, TLB flushing in response to cache miss rate may not be implemented.

The threshold may be varied according to the mode of operation of the system. For example, the threshold can have a first value selected for operation in a first mode and a second value selected for operation in a second mode. The first mode can correspond to operation within the OS and the second mode can correspond to operation with an application program, for example. Alternatively, the first mode may correspond to operation within a high priority task and the second mode can correspond to operation within a low priority task, for example. During a critical real-time operation, it may be desirable to prevent the occurrence of a flush operation since it could impact real-time performance. In this mode, the threshold may be set to an artificially high value to prevent invocation of a flush operation, for example.

While cache 1300 is representative of shared L2 cache 112, the concepts described above can easily be applied to non-shared L1 caches such as 203, 204, 223 or 224 of FIG. 2, for example. CPUs 1300a–n are representative of processors 102, 104.

Figure 10:
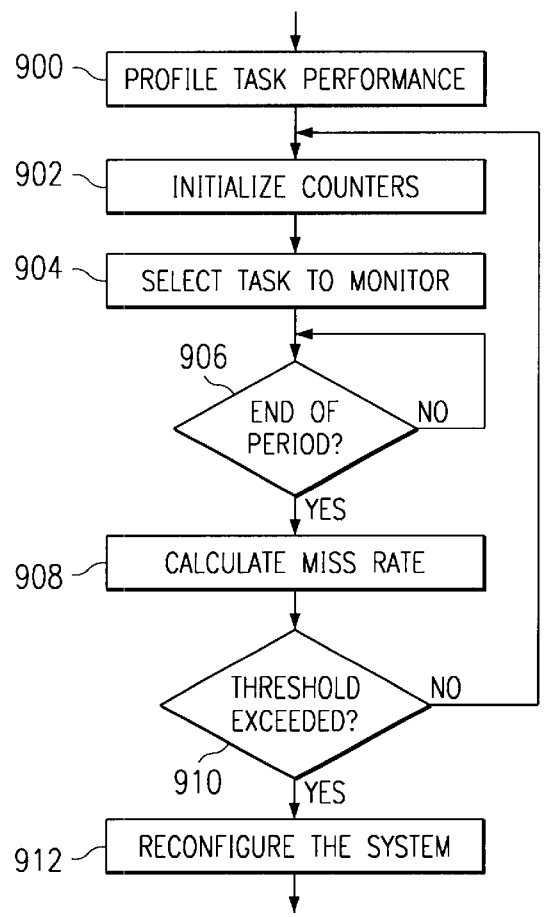
FIG. 10 is a flow diagram illustrating reconfiguration of a system in response to cache miss rate determined in accordance with FIG. 9.

FIG. 10 is a flow diagram illustrating reconfiguration of a system in response to cache miss rate determined in accordance with FIG. 9. Step 900 is a precursor step in which the system is operated and monitored in order to determine typical operating parameters, such as cache miss rate for various tasks. Task miss rate for various tasks can be determined using the cache monitoring circuit of FIG. 7B. By monitoring a system under various operating conditions, a profile can be developed that characterizes the operating parameters of the system.

Advantageously, once a set of operating parameters for a system is determined, then the system can be monitored during the course of operation and the system can be reconfigured if the expected range of an operating parameter is exceeded.

As described with reference to FIG. 9, software task 1311 monitors cache miss rate during operation of the system. In step 902, task 1311 clears miss counter 1260 and access counter 1266. In addition, a timer is initialized that will notify the monitoring task periodically.

In step 904, a task is selected for monitoring by setting the associated task-id and R-Id value in reference-ID latch 1270.

Step 906 waits for a timeout of the timer set in step 902 that defines an integration period of the cache miss rate. During this time period, the system is operating and the cache monitoring circuit records cache accesses and cache misses for the selected task.

In step 908, miss counter 1260 and access counter 1266 are read at the end of the integration period. Since both counters counted only accesses to the cache made by the selected task, a miss rate for the selected task can be calculated for the just completed integration period.

In step 910, the miss rate calculated in step 908 is compared to a miss rate threshold value that was determined in step 900 as a profile value for this given task. In the case that a profile value had not been predetermined, then a typical value, statistical value can be used. For example, a miss rate of 20% can be selected. If the measured miss rate exceeds 20%, then the system is reconfigured in step 912. If the measured miss rate is less than 20%, no action is taken and the process returns to step 902 for the next period.

For best results, the monitoring must integrate the miss rate on a sufficiently large time and also start the monitoring after a transitioning period due to a context switch. The software task monitoring the system performance can typically be non-cacheable to interfere as little as possible or be located into a RAM set 506(0) and 506(1) of FIG. 4.

Figure 11A:
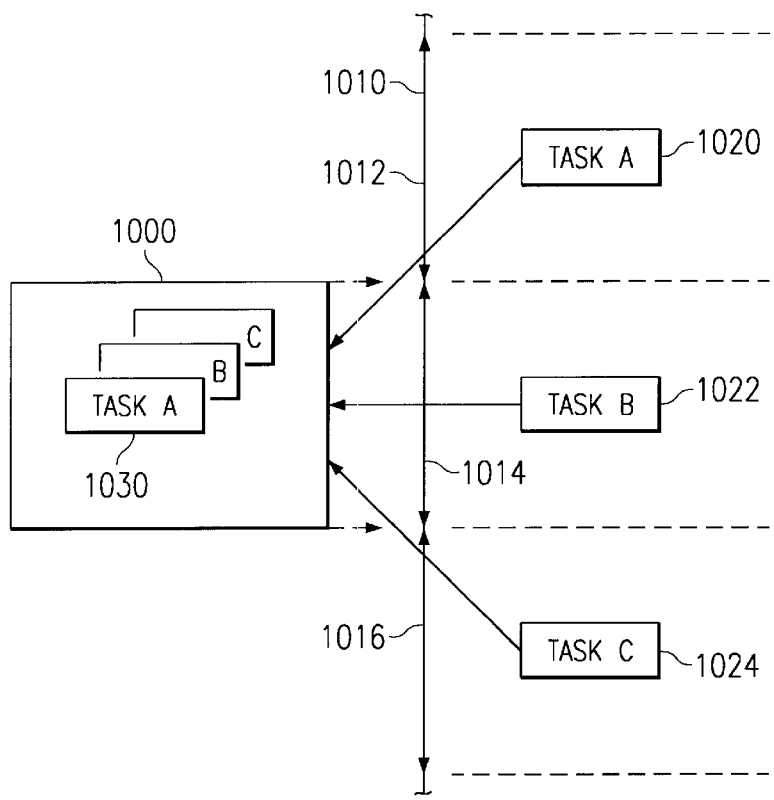
FIG. 11 is a schematic representation of a portion of the address space of the digital system of FIG. 1, illustrating reconfiguration of the digital system in response to the cache miss rate exceeding a threshold value in accordance with FIG. 10.

FIG. 11A is a schematic representation of a portion of the address space of the digital system of FIG. 1, illustrating another aspect of the system that can be reconfigured in response to the cache miss rate exceeding a threshold value. Cache 1000 maps onto address space 1010. Due to the tag organization of the cache, consecutive portions of the address space, such as 1012, 1014 and 1016 are effectively overlapped onto the cache. Because of this, a task A 1020 allocated to memory in portion 1012, for example, will be overlaid as indicated at 1030 by a task B allocated to memory portion 1004 and/or by task C allocated to memory portion 1006 if both tasks occupy the same relative addresses. Since in this example all three tasks must fight for the same portion of the cache, the resulting miss rate is likely to by high.

Figure 11B:
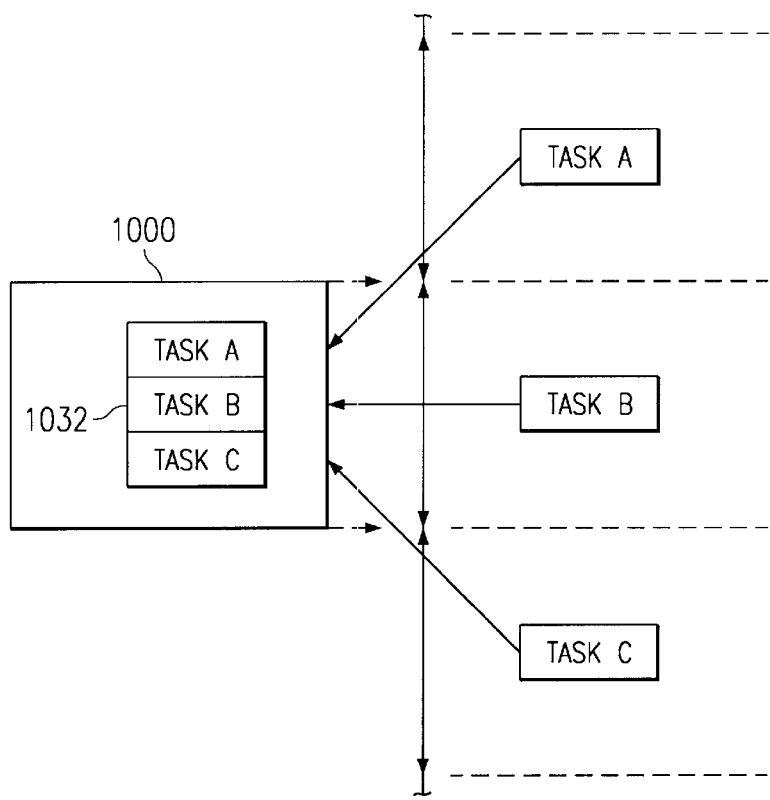

Advantageously, upon detection of a high cache miss rate, the system can be reconfigured as illustrated in FIG. 11B by reallocating task B and task C to different relative addresses so that all three tasks can be mapped into the cache simultaneously without thrashing, as indicated at 1032.

Referring again to FIG. 11A, another way to reconfigure the system in response to detection of a cache miss rate that exceeds a threshold value is to remove from the cache entries corresponding to a selected address range. This address range is then mapped to RAM set 506(0) or 506(1). This reduces conflict and improves performance of the remapped task.

Alternatively, entries could be locked thereby improving the behavior of one task at the expense of others as conflicts are not reduced. In this example, addresses that fall within address portion 1012 could be locked, for example. In this case, entries for task A would not be evicted from the cache even though accesses for task B and task C result in misses. Thus, good performance of task A would be maintained, for example. Of course, if task B or task C were more critical, entries for the address space to which they are allocated could be locked instead.

A range of addresses can be locked in the cache using a prefetch command, see Table 2. The monitoring is done by a task or an OS module; however, locking entries in a cache is typically performed by the OS kernel. The OS needs to previously verify that the addresses requested to be locked are not already in the cache. If so, they should be flushed. Then the OS must select victim entries and use a prefetch command to load the specified address range of instructions into the cache. The low address bits of the prefetch command are unused. A0 can be used to indicate if a line needs to be prefetched and locked or simply prefetched.

Alternatively, a range of address entries is locked in the cache by modifying the MMU page tables to include a field to indicate if a page of address space is to be locked. This is then indicated in the TLB by an attribute bit in attribute field 309 (see FIG. 3) for the associated page entry. A lock bit is also included in the cache tag along with valid bits 526 (see FIG. 4) which is then set in response to a signal from the TLB conveying the lock attribute. Thereafter, the control circuitry of the cache includes the cache entry lock bit in making a victim entry selection for replacement. If the cache lock bit for an entry is set, that entry will not be evicted from the cache.

Referring again to FIG. 11A, another way to reconfigure the system in response to detection of a cache miss rate that exceeds a threshold value is to define a portion of the address space allocated to certain tasks as uncacheable through the MMU tables. In this way, the cache is reserved for more critical tasks and the miss rate will thereby be reduced.

In other embodiments, other various aspects of the system may be reconfigured in response to exceeding a miss rate threshold.

Digital System Embodiment

Figure 12:
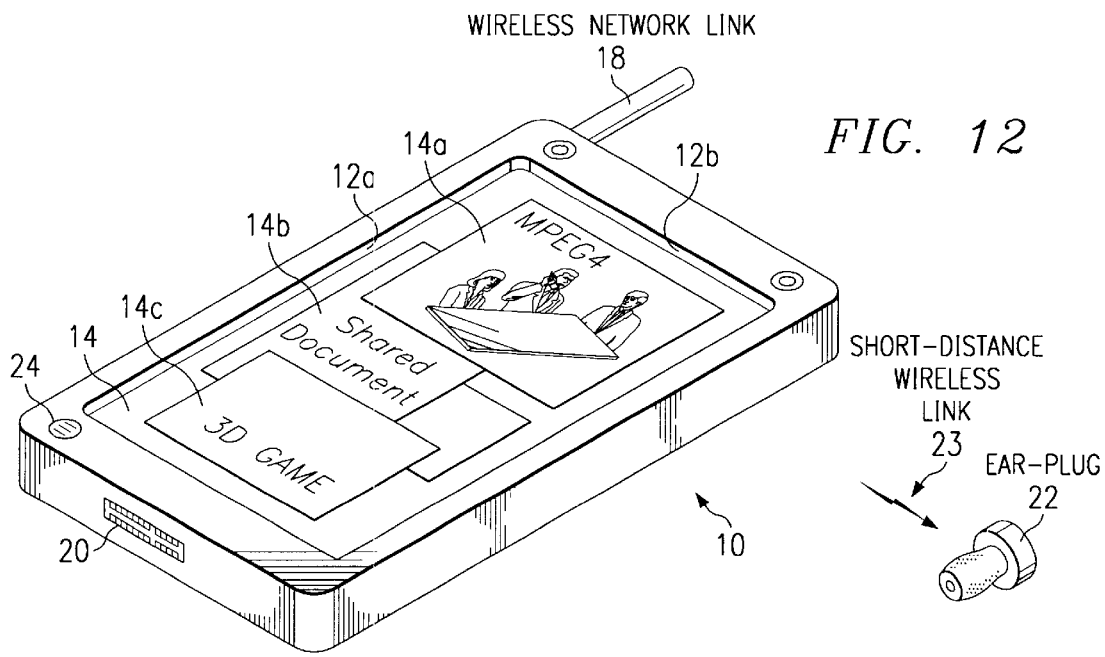
FIG. 12 is a representation of a telecommunications device incorporating an embodiment of the present invention.

FIG. 12 illustrates an exemplary implementation of an example of such an integrated circuit in a mobile telecommunications device, such as a mobile personal digital assistant (PDA) 10 with display 14 and integrated input sensors 12a, 12b located in the periphery of display 14. As shown in FIG. 12, digital system 10 includes a megacell 100 according to FIG. 1 that is connected to the input sensors 12a, b via an adapter (not shown), as an MPU private peripheral 142. A stylus or finger can be used to input information to the PDA via input sensors 12a, b. Display 14 is connected to megacell 100 via local frame buffer similar to frame buffer 136. Display 14 provides graphical and video output in overlapping windows, such as MPEG video window 14a, shared text document window 14b and three dimensional game window 14c, for example.

Radio frequency (RF) circuitry (not shown) is connected to an aerial 18 and is driven by megacell 100 as a DSP private peripheral 140 and provides a wireless network link. Connector 20 is connected to a cable adaptor-modem (not shown) and thence to megacell 100 as a DSP private peripheral 140 provides a wired network link for use during stationary usage in an office environment, for example. A short distance wireless link 23 is also "connected" to ear piece 22 and is driven by a low power transmitter (not shown) connected to megacell 100 as a DSP private peripheral 140. Microphone 24 is similarly connected to megacell 100 such that two-way audio information can be exchanged with other users on the wireless or wired network using microphone 24 and wireless ear piece 22.

Megacell 100 provides all encoding and decoding for audio and video/graphical information being sent and received via the wireless network link and/or the wire-based network link.

It is contemplated, of course, that many other types of communications systems and computer systems may also benefit from the present invention, particularly those relying on battery power. Examples of such other computer systems include portable computers, smart phones, web phones, and the like. As power dissipation and processing performance is also of concern in desktop and line-powered computer systems and micro-controller applications, particularly from a reliability standpoint, it is also contemplated that the present invention may also provide benefits to such line-powered systems.

Fabrication of the digital systems disclosed herein involves multiple steps of implanting various amounts of impurities into a semiconductor substrate and diffusing the impurities to selected depths within the substrate to form transistor devices. Masks are formed to control the placement of the impurities. Multiple layers of conductive material and insulative material are deposited and etched to interconnect the various devices. These steps are performed in a clean room environment.

A significant portion of the cost of producing the data processing device involves testing. While in wafer form, individual devices are biased to an operational state and probe tested for basic operational functionality. The wafer is then separated into individual dice which may be sold as bare die or packaged. After packaging, finished parts are biased into an operational state and tested for operational functionality.

The digital systems disclosed herein contain hardware extensions for advanced debugging features. These assist in the development of an application system. Since these capabilities are part of the megacell itself, they are available utilizing only a JTAG interface with extended operating mode extensions. They provide simple, inexpensive, and speed independent access to the core for sophisticated debugging and economical system development, without requiring the costly cabling and access to processor pins required by traditional emulator systems or intruding on system resources.

As used herein, the terms "applied," "connected," and "connection" mean electrically connected, including where additional elements may be in the electrical connection path. "Associated" means a controlling relationship, such as a memory resource that is controlled by an associated port. The terms assert, assertion, de-assert, de-assertion, negate and negation are used to avoid confusion when dealing with a mixture of active high and active low signals. Assert and assertion are used to indicate that a signal is rendered active, or logically true. De-assert, de-assertion, negate, and negation are used to indicate that a signal is rendered inactive, or logically false.

Thus, a system and method of operation is provided in which a digital system is reconfigured in response to detecting a cache miss rate that exceeds a selected threshold. By reconfiguring the system, the miss rate is reduced. Advantageously, better performance is obtained due to the lower overall cache miss rate. Advantageously, power is reduced by eliminating memory accesses to backup memory that occur to satisfy a cache miss.

While the invention has been described with reference to illustrative embodiments, this description is not intended to be construed in a limiting sense. Various other embodiments of the invention will be apparent to persons skilled in the art upon reference to this description. For example, in another embodiment, the L2 cache may be a simple cache that does not include RAM-set or configurable features while still providing qualifier fields for cache operation commands. The cache may be positioned at a level other than L2. The cache may have a different set organization with a different number of segments per line, for example. The cache may have other than two qualifier fields in each tag entry.

The miss counter may be qualified on an identifier other than task ID, for example. The qualifier may by a resource ID value, such that only misses for requests from a specified resource are counted. Conversely, the qualifier value may be exclusionary so that all misses except those associated with a specified task are counted, for example.

It is therefore contemplated that the appended claims will cover any such modifications of the embodiments as fall within the true scope and spirit of the invention.

What is claimed is:

1. A method of operating a digital system having a cache, the cache having a plurality of lines with an associated plurality of tags, the method comprising the steps of;

processing a plurality of memory requests in response to program execution by the digital system;

loading a plurality of data entries into a first plurality of lines in the cache in response to the plurality of memory requests and setting each tag associated with the plurality of data entries to a valid state;

selecting a monitored-qualifier value;

determining a miss rate for a qualified set of memory requests in response to the monitored-qualifier value;

selecting a threshold value for the miss rate, wherein the step of selecting a threshold results in a first value selected for operation in a first mode and a second value selected for operation in a second mode; and reconfiguring an aspect of the digital system if the miss rate exceeds the threshold value.

2. The method of claim 1, wherein the step of processing is in the first mode of operation when executing a first program task and is in the second mode of operation when executing a second program task.

3. The method of claim 1, further comprising the step of:

storing a qualifier value in each tag that is in a valid state, wherein the qualifier value specifies a usage characteristic of data stored in an associated line of the first plurality of lines of the cache; and wherein the step of reconfiguring comprises flushing a set of entries selected from the plurality of data entries having a selected qualifier value.

4. The method according to claim 3, wherein the qualifier value represents a task-ID indicative of a program task.

5. The method according to claim 1, wherein the step of reconfiguring comprises remapping a selected program portion to operate in a different address range.

6. The method according to claim 1, wherein the step of reconfiguring comprises evicting from the cache all entries corresponding to a suspended program task.

7. The method according to claim 1, wherein the step of reconfiguring comprises locking a portion of the data entries within the cache.

8. The method according to claim 1, wherein the step of reconfiguring comprises defining addresses corresponding to a selected program task as uncacheable.

9. The method according to claim 1, wherein the step of reconfiguring comprises flushing selected entries from a translation lookaside buffer (TLB).

10. A digital system having a cache, wherein the cache comprises:

a data array having a plurality of lines for holding data a tag array having a plurality of lines for holding a plurality of tags, each line of the tag array being associated with a particular line of the data array, wherein each line of the tag array comprises an address field and a qualifier field;

control circuitry connected to the tag array and having an output for indicating a cache miss, wherein the control circuitry comprises storage circuitry operable to store a specified qualifier value in response to an operation command received on a control port and a comparator with a first input connected to the tag array to receive the qualifier field, and with a second input connected to the storage circuitry to receive the specified qualifier value, and with an output operable to indicate if the qualifier field is equal to the specified Qualifier value;

a miss counter connected to the control circuitry; and monitored-qualifier circuitry connected to the miss counter, wherein the monitored-qualifier circuitry is operable to enable the miss counter to selectively count each miss detected by the control circuitry.

11. The digital system according to claim 10, wherein the control circuitry is operable to evict a selected line of the cache in response to the output of the comparator.

12. The digital system according to claim 11, wherein each line of the tag array comprises a lock bit, and wherein the control circuitry is operable to not evict a given line if a lock bit associated with the given line has a first value.

13. The digital system according to claim 10, being a personal digital assistant, further comprising:

a processor (CPU) connected to the control port of the cache;

a display, connected to the CPU via a display adapter;

radio frequency (RF) circuitry connected to the CPU; and an aerial connected to the RF circuitry.

* * * * *